(12) United States Patent
Shinkai et al.

(10) Patent No.: US 8,023,799 B2
(45) Date of Patent: Sep. 20, 2011

(54) RECORDING CONTROL DEVICE, RECORDING CONTROL METHOD, AND PROGRAM

(75) Inventors: Mitsutoshi Shinkai, Kanagawa (JP); Takayoshi Kawamura, Kanagawa (JP)

(73) Assignee: Sony Corporation, Tokyo (JP)

(*) Notice: Subject to any disclaimer, the term of this patent is extended or adjusted under 35 U.S.C. 154(b) by 1147 days.

(21) Appl. No.: 11/807,826

(22) Filed: May 30, 2007

(65) Prior Publication Data

US 2007/0269180 A1 Nov. 22, 2007

(30) Foreign Application Priority Data

May 31, 2006 (JP) .................................. 2006-151013

(51) Int. Cl.
*H04N 5/93* (2006.01)
*H04N 5/76* (2006.01)
*G11B 27/00* (2006.01)
*H04N 5/92* (2006.01)
*H04N 5/84* (2006.01)
*H04N 5/89* (2006.01)

(52) U.S. Cl. ........ 386/281; 386/278; 386/294; 386/326; 386/332; 386/334; 386/336

(58) Field of Classification Search .................. 386/281, 386/278, 294, 326, 332, 334, 336
See application file for complete search history.

(56) References Cited

U.S. PATENT DOCUMENTS

| | | | | |
|---|---|---|---|---|
| 7,587,123 B2* | 9/2009 | Shibata et al. | ................ | 386/278 |
| 7,639,923 B2* | 12/2009 | Ikeda et al. | .................. | 386/335 |
| 7,743,037 B2* | 6/2010 | Ando et al. | .................... | 707/693 |
| 7,783,172 B2* | 8/2010 | Seo et al. | ....................... | 386/241 |
| 7,804,505 B2* | 9/2010 | Watanabe et al. | ............. | 345/547 |
| 7,876,647 B2* | 1/2011 | Shinkai et al. | ............... | 369/30.3 |
| 2002/0057894 A1* | 5/2002 | Ishige | ............................. | 386/46 |
| 2004/0247284 A1* | 12/2004 | Yamasaki | ....................... | 386/52 |
| 2005/0213935 A1* | 9/2005 | Shibata et al. | .................. | 386/52 |
| 2006/0059200 A1* | 3/2006 | Sakai et al. | ................. | 707/104.1 |
| 2007/0206920 A1* | 9/2007 | Hirose et al. | .................... | 386/95 |

FOREIGN PATENT DOCUMENTS

| JP | 2004 171684 | 6/2004 |
|---|---|---|
| JP | 2004-312233 | 11/2004 |
| JP | 2005 6231 | 1/2005 |
| JP | 2006 19996 | 1/2006 |

* cited by examiner

*Primary Examiner* — Thai Tran
*Assistant Examiner* — Daquan Zhao
(74) *Attorney, Agent, or Firm* — Frommer Lawrence & Haug LLP; William S. Frommer

(57) ABSTRACT

A recording control device for controlling a recording operation on a first recording medium on which first identification information for identifying the recording medium, first data, and data editing information which is information on an editing result of the first data are recorded includes a reading unit for reading second identification information from a detachable second recording medium on which the second identification information, first small data, and first small data editing information are recorded, a determination unit for determining whether the second identification information read by the reading unit is identical to the first identification information, and an update unit for updating the data editing information recorded on the first recording medium on the basis of the first small data editing information recorded on the second recording medium when the determination unit determines that the second identification information is identical to the first identification information.

6 Claims, 12 Drawing Sheets

FIG. 5

```
1   <?xml version="1.0" encoding="UTF-8"?>
2   <smil umid="060A2B340101010501010D4313000000B180C0009350597080046020118F805"
3    xmlns="urn:schemas-professionalDisc:edl:ver.1.00:editlist">
4     <body>
5       <par>
6         <!-- Clip1 -->
7         <ref src="urn:smpte:umid:060A2B340101010501010D43130000007D30200093505970800046020118F454"
8           clipBegin="smpte-30=00:00:00:00" clipEnd="smpte-30=00:00:06:00" begin="smpte-30=00:00:00:00"
9           trackSrc="CH1;CH2;CH3" trackDst="CH1;CH2;CH3"/>
10        <!-- Clip2 -->
11        <ref src="urn:smpte:umid:060A2B340101010501010D4313000000668302009235058008004602011 8F7D8"
12          clipBegin="smpte-30=00:00:00:00" clipEnd="smpte-30=00:00:04:00" begin="smpte-30=00:00:06:00"
13          trackSrc="CH1;CH2;CH3" trackDst="CH1;CH2;CH3"/>
14        <!-- Voice Over -->
15        <audio src="urn:smpte:umid:060A2B340101010501010843130000000D9510E0033360597080046020118F805"
16          clipBegin="smpte-30=00:00:00:00" clipEnd="smpte-30=00:00:10:00" begin="smpte-30=00:00:00:00"
17          trackSrc="CH4" trackDst="CH4"/>
18      </par>
19    </body>
20  </smil>
```

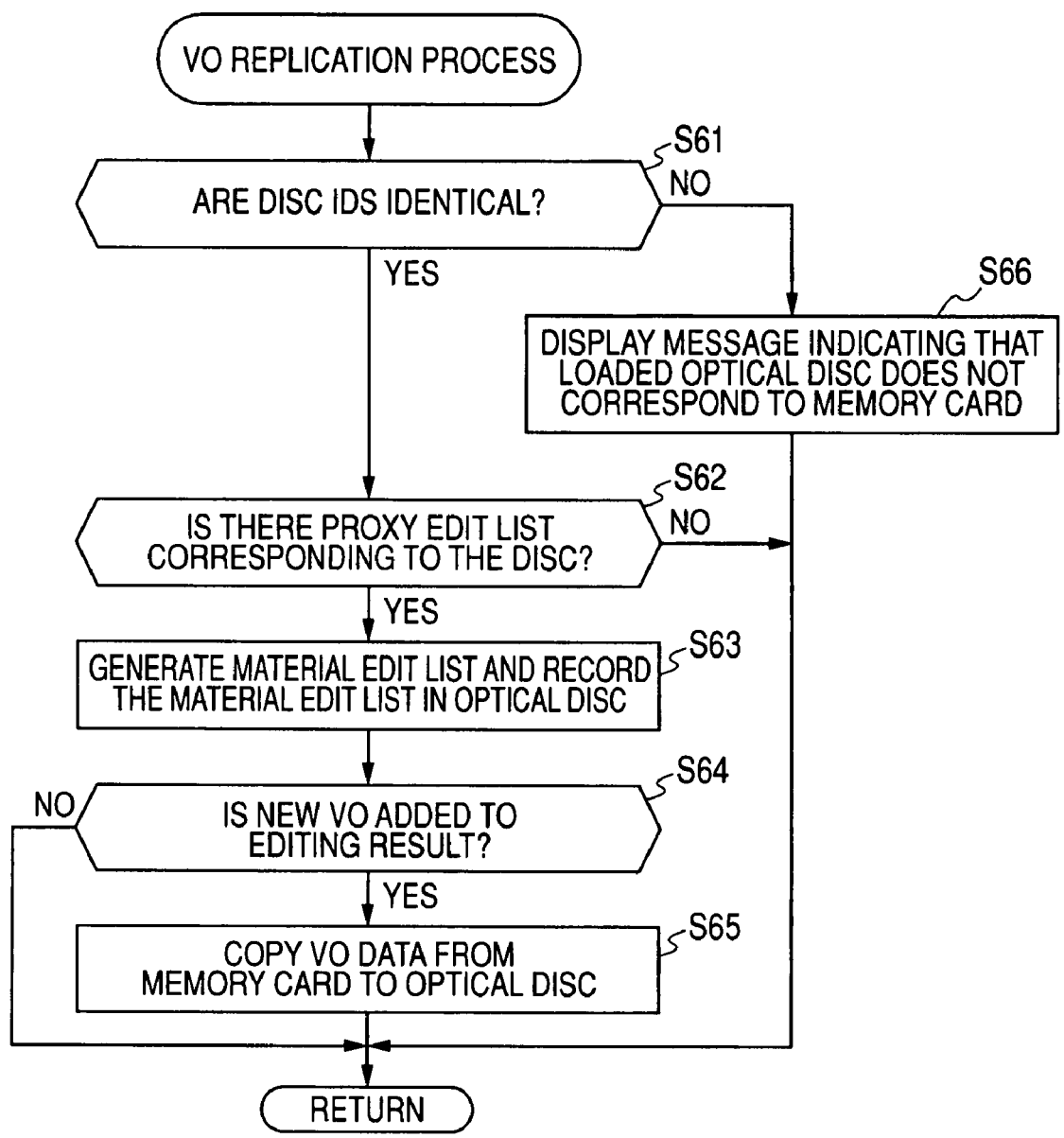

RECORDING CONTROL DEVICE, RECORDING CONTROL METHOD, AND PROGRAM

CROSS REFERENCE TO RELATED APPLICATIONS

The present invention claims a priority benefit to Japanese Patent Application JP 2006-151013 filed in the Japanese Patent Office on May 31, 2006, the entire contents of which are hereby incorporated by reference herein.

BACKGROUND

1. Technical Field

The present invention relates generally to a recording control device, a recording control method, and a program, and more particularly, to a recording control device, a recording control method, and a program which are capable of updating editing information of predetermined data on the basis of data obtained by reducing the data size of the predetermined data.

2. Background Discussion

Typically, video recording devices which generate/record editing information for high-resolution video on the basis of the editing result of low-resolution video transmitted from another device through a network. For example, such a recording and reproducing device is disclosed in U.S. Patent Application Publication No. 2005/0213935.

SUMMARY OF THE INVENTION

However, typical video recording devices operate at less than optimal efficiency because oftentimes, high resolution data is processed, when low resolution data could be used instead. Processing low resolution is much faster and from a processing perspective, much more efficient. Accordingly, it is difficult to reflect the editing result of a video such as a low-resolution video, which is obtained by reducing the data size of a predetermined video, performed by another device on the editing result of the predetermined video performed by the video recording device.

Therefore, embodiments of the present invention provide a method and apparatus for updating editing information for high-resolution video which has been recorded in the video recording device corresponding to low resolution video on the basis of editing information that is acquired from the editing result of the low-resolution video by the video recording device.

According to one embodiment of the present invention is directed to editing information on an editing result of predetermined data that can be updated on the basis of editing information that is information on an editing result of data obtained by reducing the data size (resolution) of the predetermined data.

According to another embodiment of the invention, there is provided a recording control device for controlling a recording operation on a first recording medium on which first identification information for identifying the recording medium, first data, and data editing information which is information on an editing result of the first data are recorded, the recording control device including a reading unit for reading second identification information from a detachable second recording medium on which the second identification information for identifying a predetermined recording medium, first small data (low resolution data) which is obtained by reducing the data size of second data recorded on the predetermined recording medium, and first small data (low resolution data) editing information which is information on an editing result of the first small (low resolution) data are recorded, a determination unit for determining whether the second identification information read by the reading unit is identical to the first identification information, and an update unit for updating the data editing information recorded on the first recording medium on the basis of the first small data editing information recorded on the second recording medium when the determination unit determines that the second identification information is identical to the first identification information.

Furthermore, additional data to be added to the editing result of the first small data (low resolution) may be recorded on the second recording medium, the first small data editing information may be the editing result of the first small data to which the additional data is added, and the update unit may additionally record the additional data on the first recording medium, when the determination unit determines that the second identification information is identical to the first identification information.

In a recording control device according to yet another embodiment of the invention, a third recording medium which can be attached or detached may be installed, and the record control device further includes a recording control unit for recording on the third recording medium the first identification information, second small data which is obtained by reducing the data size of the first data, and second small data editing information which is information on the editing result of the second small data generated on the basis of the data editing information.

According to yet another embodiment of the invention, there is provided a recording control method for a recording control device for controlling a recording operation on a first recording medium on which first identification information for identifying the recording medium, first data, and data editing information which is information on the editing result of the first data are recorded, the method including the steps of reading second identification information from a detachable second recording medium on which the second identification information for identifying a predetermined recording medium, first small data which is obtained by reducing the data size of second data recorded on the predetermined recording medium, and first small data editing information which is information on an editing result of the first small data are recorded, determining whether the read second identification information is identical to the first identification information, and updating the data editing information recorded on the first recording medium on the basis of the first small data editing information recorded on the second recording medium when the second identification information is determined to be identical to the first identification information.

According to yet another embodiment of the invention, there is provided a program allowing a computer to execute a process of controlling a recording operation on a first recording medium on which first identification information for identifying the recording medium, first data, and data editing information which is information on the editing result of the first data are recorded, the program including the steps of reading second identification information from a detachable second recording medium on which the second identification information for identifying a predetermined recording medium, first small data which is obtained by reducing the data size of second data recorded on the predetermined recording medium, and first small data editing information which is information on an editing result of the first small data are recorded, determining whether the read second identification information is identical to the first identification information, and updating the data editing information recorded on the first recording medium on the basis of the first small data editing information recorded on the second recording medium when the second identification information is determined to be identical to the first identification information.

According to yet another embodiment of the invention, second identification information is read from second recording medium when the detachable second recording medium recording second identification information for identifying a predetermined recording medium, first small data which is obtained by reducing the data size of second data recorded on the predetermined recording medium, and first small data editing information which is information on an editing result of the first small data are recorded is loaded. Then, it is determined whether the read second identification information is identical to the first identification information. The data editing information as the information on an editing result of the first data recorded on the first recording medium is updated on the basis of the small data editing information recorded on the second recording medium when the second identification information is determined to be identical to the first identification information.

As described above, according to embodiments of the invention, the editing information which is information on the editing result can be updated. In addition, according to yet another embodiment of the invention, the editing information on the editing result of predetermined data can be updated on the basis of editing information of data obtained by reducing the data size of the predetermined data.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 5 is a diagram showing an example of a material edit list to which the VO has been added according to an embodiment of the invention.

FIG. 12 is a flowchart describing a VO replicating process according to an embodiment of the invention.

DETAILED DESCRIPTION

Figure 1:
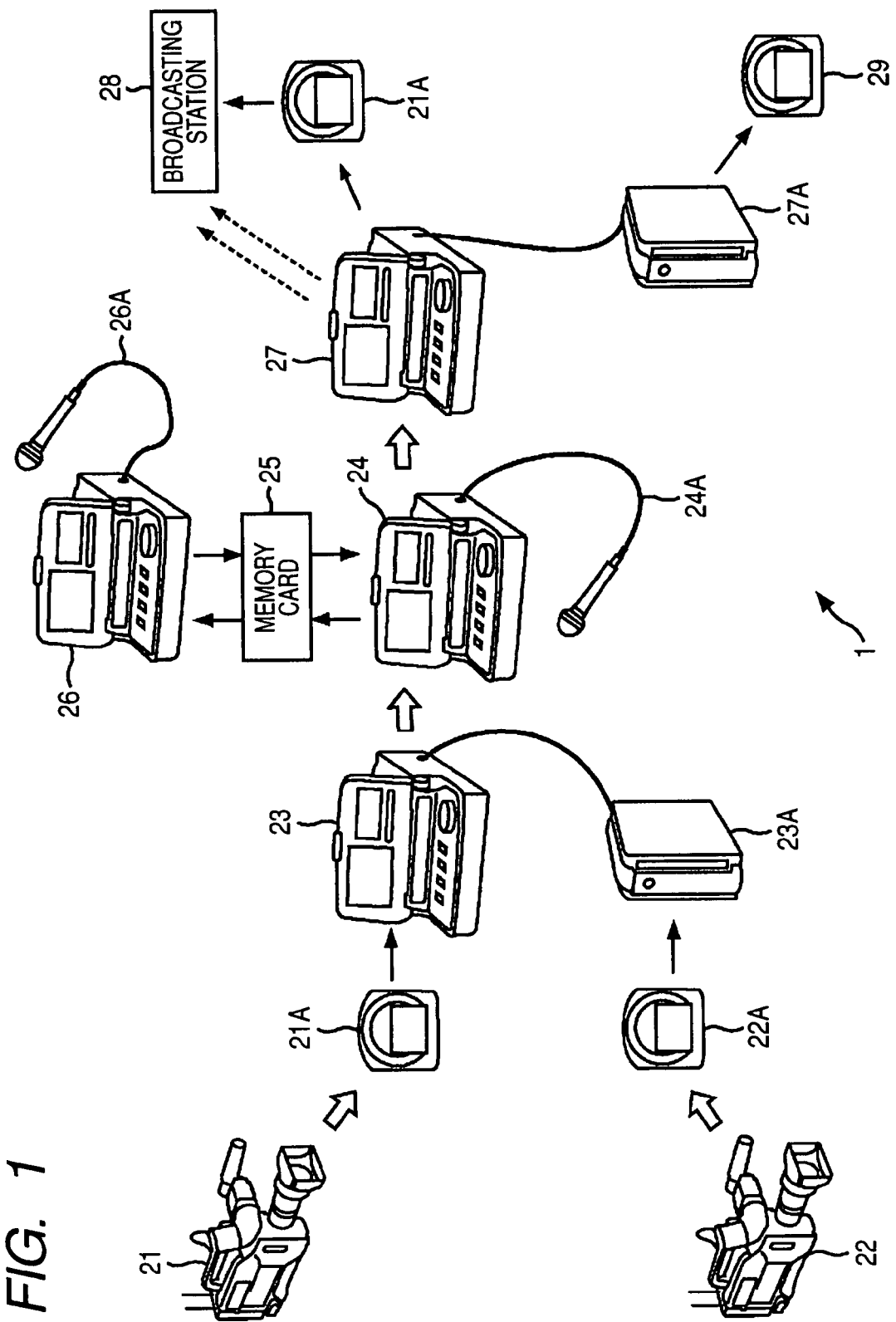
FIG. 1 shows an example of an editing system according to an embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Hereinafter, embodiments of the present invention will be described in detail with reference to the accompanying drawings.

FIG. 1 shows an example of an editing system 1 according to an embodiment of the invention.

The editing system 1 shown in FIG. 1, for example, is used for editing of a recorded television program. The process of editing of a television program is classified into disc aggregation, video editing, addition of voice-over (hereinafter, referred to as VO), and white packet transmission or white packet recording.

The disc aggregation is a process of aggregating material data such as video data or voice data for each scene constituting a television program which is stored on a plurality of optical discs onto one optical disc. The video editing is a process of performing nonlinear editing by selecting a range of material data that may be typically required and arranging the material data corresponding to the selected range in an intended order.

The addition of VO is a process of adding voice-over data (hereinafter, referred to as VO data) to an editing result by recording the VO data for simultaneous reproduction of the VO data which is voice data such as narration with the material data constituting the editing result of the video editing. The white packet transmission is a process of transmitting the editing result to which the VO has been added to a broadcasting station or the like as a white packet. A white packet indicates uncompleted data on which a process of superimposing a text or a diagram has not been performed. The white packet recording is a process of recording a white packet on an optical disc or the like.

The editing system 1 shown in FIG. 1 supports operations in the above-described processes. The editing system 1 includes camcorders 21 and 22, a video editing device 23, VO adding devices 24 and 26, and a white packet recording device 27.

The camcorders 21 and 22 are devices used for recording a news program, which is a television program, or picking-up images (including voice acquisition) of a sport game, a film, or the like. The camcorders 21 and 22 record material data acquired by picking-up the images of a subject or the like on an optical disc 21A or 22A in units of files.

In addition, the camcorders 21 and 22 generate information such as information on recording on the basis of a user's input, for example, information which is useful for video editing in a latter stage and relate the generated information with the material data acquired by the camcorders 21 and 22 as meta-data.

The optical disc 21A or 22A on which the material data or the meta-data related with the material data is recorded is loaded into an internal drive (now shown) or an external drive 23A of the video editing device 23.

The video editing device 23 is used for aggregating material data for each scene constituting the television program recorded on the optical disc 21A or 22A which is loaded into the internal drive or the external drive 23A into one optical disc 21A and editing the material data aggregated into the optical disc 21A.

The video editing device 23 copies the material data recorded on the optical disc 22A into the optical disc 21A as may be needed. In addition, the video editing device 23 edits the material data recorded on the optical disc 21A on the basis of a user's input, creates a material edit list which is information on the editing result of the material data, and records the material edit list on the optical disc 21A.

The VO adding devices 24 and 26 are used for adding the VO to the editing result acquired by the video editing device 23. Microphones 24A and 26A are respectively attached to the VO adding devices 24 and 26.

The VO adding devices 24 and 26 reproduce the material data constituting the editing result which is recorded on the optical disc 21A on the basis of the material edit list recorded on the optical disc 21A which is loaded into the VO adding devices 24 and 26. The VO adding devices 24 and 26 respectively add voice input from microphones 24A and 26A to the editing result as the VO while reproducing the material data. In other words, the VO adding devices 24 and 26 record the VO data on the optical disc 21A, so that the VO data which is voice data input during the reproduction of the editing result is reproduced simultaneously with the material data constituting the editing result.

In addition, the VO adding devices 24 and 26 record proxy data (i.e., low resolution of the clip data) obtained by reducing the size of the material data, information identifying the optical disc 21A, a proxy edit list created on the basis of the material edit list which is recorded on the optical disc 21A, and the like, which are recorded on the optical disc 21A, in a memory card 25, whereby the memory card 25 is prepared as a memory card for VO data recording. The proxy edit list is information on the editing result of the proxy data. The VO adding devices 24 and 26 create the proxy edit list in which the editing result of the proxy data is set to the proxy data converted from the material data constituting the editing result of material data corresponding to material edit list on the basis of material edit list.

In addition, the VO adding devices 24 and 26 reproduce the proxy data on the basis of the proxy edit list which is recorded in the memory card 25 installed thereto and add voice input from the microphones 24A or 26A during the reproduction of the proxy data to the proxy data as the VO. In other words, the VO adding devices 24 and 26 record the VO data on the optical disc 21A such that the VO data, which is data for the voice input during the reproduction of proxy data, is reproduced simultaneously with the proxy data corresponding to the proxy edit list. Accordingly, the proxy edit list recorded in the memory card 25 is updated.

In addition, the VO adding devices 24 and 26 update the material edit list recorded on the optical disc 21A on the basis of the proxy edit list recorded in the memory card 25 installed thereto.

The white packet recording device 27 is used for transferring/recording the editing result to which the VO has been added as a white packet. An optical disc 21A on which the VO data has been recorded by the VO adding device 24 or 26 is loaded into an internal drive (not shown) of the white packet recording device 27, the material data and the VO data which are recorded on the optical disc 21A are reproduced simultaneously as a white packet on the basis of the material edit list recorded on the optical disc 21A, and the white packet is transferred to the broadcasting station 28 as a base band using an FPU (Field Pickup Unit) or an SNG (Satellite News Gathering).

In addition, the white packet recording device 27 combines material data constituting the editing results which are recorded on the optical disc 21A on the basis of the material edit list recorded on the optical disc 21A on which the VO data has been added and overwrites the VO data of a predetermined channel to voice data of a predetermined channel included in the material data. The material data resulting from the overwriting of the VO data is sent to the broadcasting station 28 as one white packet in compliance with a protocol or mode, such as an FTP (File Transfer Protocol) or an FAM (File Access Mode).

The FAM is a format among data handling formats, such as i.LINK™ (i.LINK is a registered trademark of Sony Corporation) for sending/receiving data in a file format. The broadcasting station 28, for example, records one file as the white packet on an optical disc or the like which is not shown in the figure, whereby an optical disc recording the one file as the white packet is prepared.

The optical disc 21A on which the VO data is recorded may be sent to the broadcasting station 28 by hand delivered, or delivered by mail.

Moreover, on the optical disc 21A, the material data constituting the editing results recorded on the optical disc may be combined on the basis of the material edit lists recorded on the optical disc, and the material data obtained by overwriting VO data of a predetermined channel to voice data of a predetermined channel included in the material data may be recorded in a unwritten region of a recording region of the optical disc 21A, in which nothing has been recorded, as one white packet.

As described above, the broadcasting station 28 generates an entire packet which is completed AV (Audio Video) data as a television program by superimposing texts or diagrams on the white packet which is sent from the white packet recording device 27 as described above.

When an optical disc 29 is loaded into a drive 27A which is connected to the white packet recording device 27, the white packet recording device 27 may record the file of one white packet in the unwritten region of the optical disc 29.

Moreover, although the camcorders 21 and 22, the video editing device 23, the VO adding devices 24 and 26, and the white packet recording device 27 are separate devices in FIG. 1, but it is also an embodiment of the present invention that some of them or all of them may be integrated into a single unit or one or more components.

Moreover, although the optical discs 21A and 22A are loaded into an internal or external drive 23A of the video editing device 23 and the reading or recording is performed on the discs 21A and 22A in FIG. 1, the video editing device 23 may be connected to the camcorder 21 into which the optical disc 21A is loaded and the camcorder 22 into which the optical disc 22A is loaded through a network and the reading or recording may be performed on the discs 21A and 22A through the network, or local area network (LAN) wide area network (WAN) or other transmission medium, such as a bus or wireless connection (transmission media not shown).

Hereinafter, the camcorders 21 and 22, are collectively referred to as a camcorder 20. Also, hereinafter, the VO adding devices 24 and 26, are collectively referred to as a VO adding device 30, and the microphones 24A and 26A, are collectively referred to as a microphone 30A.

Figure 2:
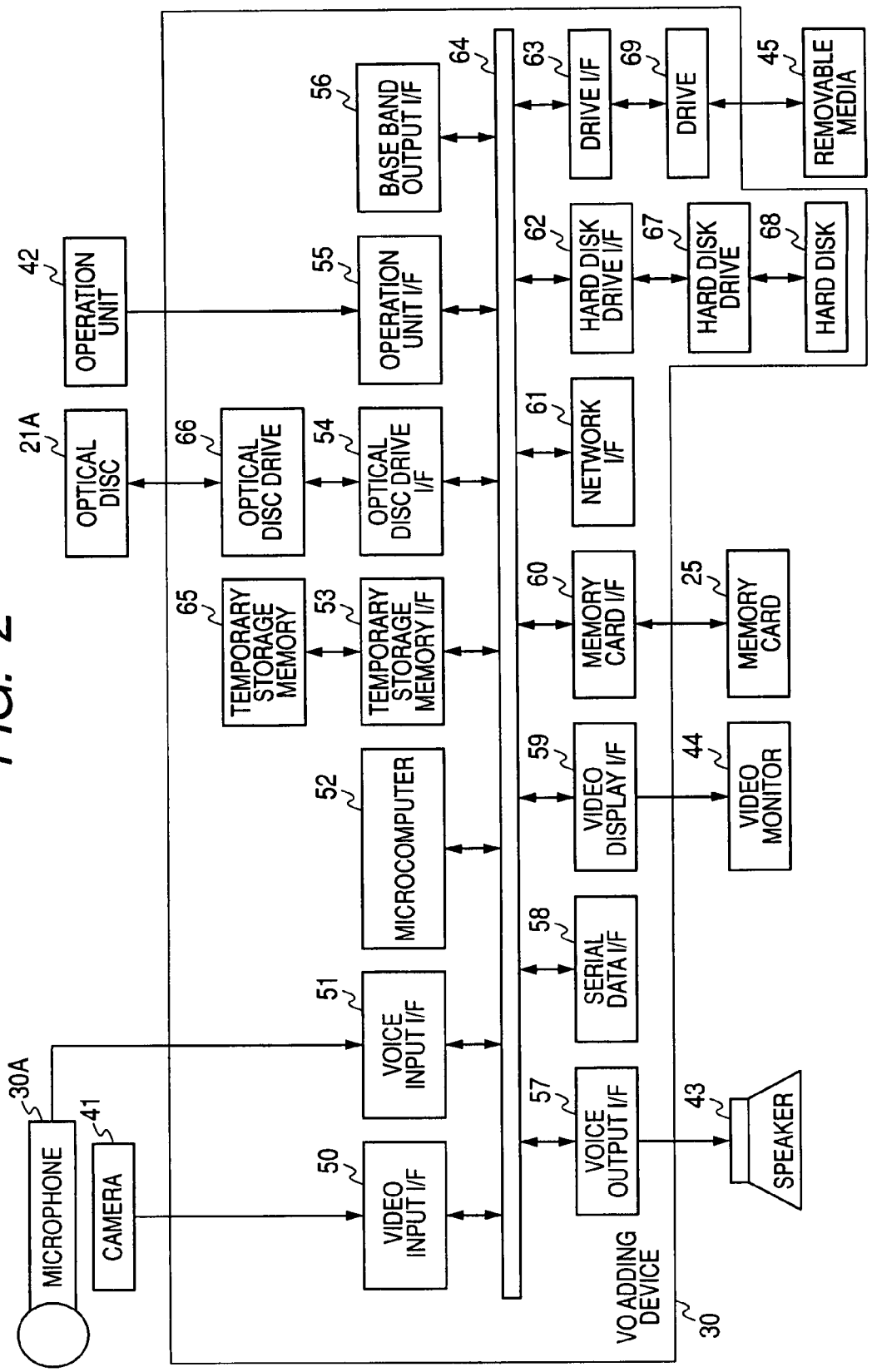
FIG. 2 is a block diagram showing an example of a hardware configuration of a voice over (VO) adding device according to an embodiment of the invention.

FIG. 2 is a block diagram showing a hardware configuration of the VO adding device 30 shown in FIG. 1.

In the VO adding device 30 shown in FIG. 2, a video input I/F (Interface) 50, a voice input I/F 51, a microcomputer 52, a temporary storage memory I/F 53, an optical disc drive I/F 54, an operation unit I/F 55, a base band output I/F 56, a voice output I/F 57, a serial data I/F 58, a video display I/F 59, a memory card I/F 60, a network I/F 61, a hard disk drive I/F 62, and a driver I/F 63 are connected to a system bus 64 through a data bus, or other communication media.

An external camera 41 is connected to the video input I/F 50, and a video signal acquired from image picking-up of the camera 41 is input to the video input I/F 50 from the camera 41. The video input I/F 50 supplies synchronous signals such as a signal in compliance with the SDI (Serial Digital Interface) standard, a composite signal, and a component signal which are included in the video signal to the video display I/F 59 and the like though the system bus 64 as video data.

An external microphone 30A is connected to the voice input I/F 51, and a voice signal which is an analog signal of the VO acquired by the microphone 30A is input to the voice input I/F 51. The voice input I/F 51 performs A/D (Analog/Digital) conversion on the voice signal and supplies a resultant digital signal to the temporary storage memory I/F 53 through the system bus 64 as VO data.

The microcomputer 52 includes a CPU (Central Processing Unit), a ROM (Read Only Memory), and a RAM (Random Access Memory). The CPU of the microcomputer 52 controls parts of the VO adding device 30 on the basis of an operation signal or the like from the operation unit 55 in accordance with programs stored in the ROM or a hard disk 68. In the RAM, a program executed by the CPU, data, or the like is stored appropriately.

A temporary storage memory 65 such as a buffer is connected to the temporary storage memory I/F 53, and the temporary storage memory I/F 53 stores the VO data supplied from the voice input I/F 51, the material data supplied from the optical disc drive I/F 54, and the like in the temporary storage memory 65. In addition, the temporary storage memory I/F 53 reads out the VO data stored in the temporary storage memory 65 and supplies the read VO data to the optical disc drive I/F 54 through the system bus 64. As a result, the VO data is recorded on the optical disc 21A.

In addition, the temporary storage memory I/F 53 supplies voice data included in the material data which is stored in the temporary storage memory 65 to the voice output I/F 57 through the system bus 64 and supplies the video data to the video display I/F 59 through the system bus 64. As a result, the material data stored in the optical disc 21A is reproduced while being buffered in the temporary storage memory 65.

An optical disc drive unit 66 into which the optical disc 21A is loaded is connected to the optical disc drive I/F 54. The optical disc drive I/F 54 controls the optical disc drive unit 66, reads out the material data by seeking a predetermined position on the optical disc 21A with a pickup (not shown) arranged in the optical disc drive unit 66, and supplies the read material data to the temporary storage memory I/F 53 or the base band output I/F 56 through the system bus 64. In addition, the optical disc drive I/F 54 controls the optical disc drive unit 66 such that the VO data from the temporary storage memory I/F 53 is recorded on the optical disc 21A.

The operation unit 42 such as a reception unit for receiving a direction sent from a keyboard, a mouse, or a remote control which is arranged externally is connected to the operation unit I/F 55. The operation unit I/F 55 generates an operation signal in accordance with a user's operation of the operation unit 42 and supplies the operation signal to the microcomputer 52 through the system bus 64.

The base band output I/F 56 outputs the material data sent from the optical disc drive I/F 54 to an FPU device or an SNG device as a base band.

An external speaker 43 is connected to the voice output I/F 57. The voice output I/F 57 performs D/A (Digital/Audio)

conversion on the voice data supplied from the temporary storage memory I/F 53, amplifies the resultant analog signal, and supplies the amplified analog signal to the speaker 43. The speaker 43 outputs voice externally on the basis of the analog signal supplied from the voice output I/F 57. Alternatively, the voice output I/F 57 may directly supply the voice data to the speaker 43, and the speaker 43 may perform D/A conversion or the like and output voice externally on the basis of the resultant analog signal.

The serial data I/F 58 sends/receives data to/from a digital device such as an external computer which is not shown in the figure as may be needed. An external video monitor 44 is connected to the image display I/F 59. The video display I/F 59 performs D/A (Digital/Audio) conversion on the video data supplied from the temporary storage memory I/F 53, amplifies the resultant analog signals such as a composite signal and a component signal, and supplies the amplified analog signal to the video monitor 44. The video monitor 44 displays a video on the basis of the analog signal supplied from the image display I/F 59. In addition, a time code corresponding to the video may be displayed along with the video in the video monitor 44.

Alternatively, the image display I/F 59 may directly supply the video data to the image monitor 44, and the image monitor 44 may perform D/A conversion or the like and output a video externally on the basis of the resultant analog signal.

The memory card I/F 60 reads/writes the video data, the voice data, and various setting data from/to the memory card 25 which is installed into the VO adding device 30 as may be needed. The network I/F 61 sends/receives data to/from a device which is connected thereto through a network such as the Internet or a local area network as may be needed.

For example, the network I/F 61 acquires a program from another device through a network and records the program in a hard disk 68 through the system bus 64, the hard disk drive I/F 62, and the hard disk drive 67.

The hard disk drive I/F 62 reads/writes data from/to the hard disk 68. For example, the hard disk drive I/F 62 records a program supplied through the network I/F 61 and the system bus 64 in the hard disk 68.

The hard disk drive unit 67 into which the hard disk 68 is installed is connected to the hard disk drive I/F 62. The hard disk drive I/F 62 reads/writes data from/to the hard disk 68 by controlling the hard disk drive unit 67. For example, the hard disk drive I/F 62 records the program supplied through the network I/F 61 and the system bus 64 in the hard disk 68 by controlling the hard disk drive unit 67.

A disc drive unit 69 is connected to the drive I/F 63. When a removable medium 45 such as a magnetic disc, an optical disc, optical magnetic disc, or a semiconductor memory is loaded into the drive unit 69, the drive I/F 63 drives the removable medium 45 to acquire a program or data recorded therein by controlling the drive unit 69. The acquired program or data is transferred to the hard disk 68 through the hard disk drive I/F 62 or the like as may be needed for being recorded.

The system bus 64 intermediates data transfer between parts connected thereto through the data bus.

Next, in the VO adding device 30 shown in FIG. 2, the microcomputer 52 serves as a memory card processor which performs a process on the memory card 25 installed to the VO adding device 30 by performing a predetermined program.

Figure 3:
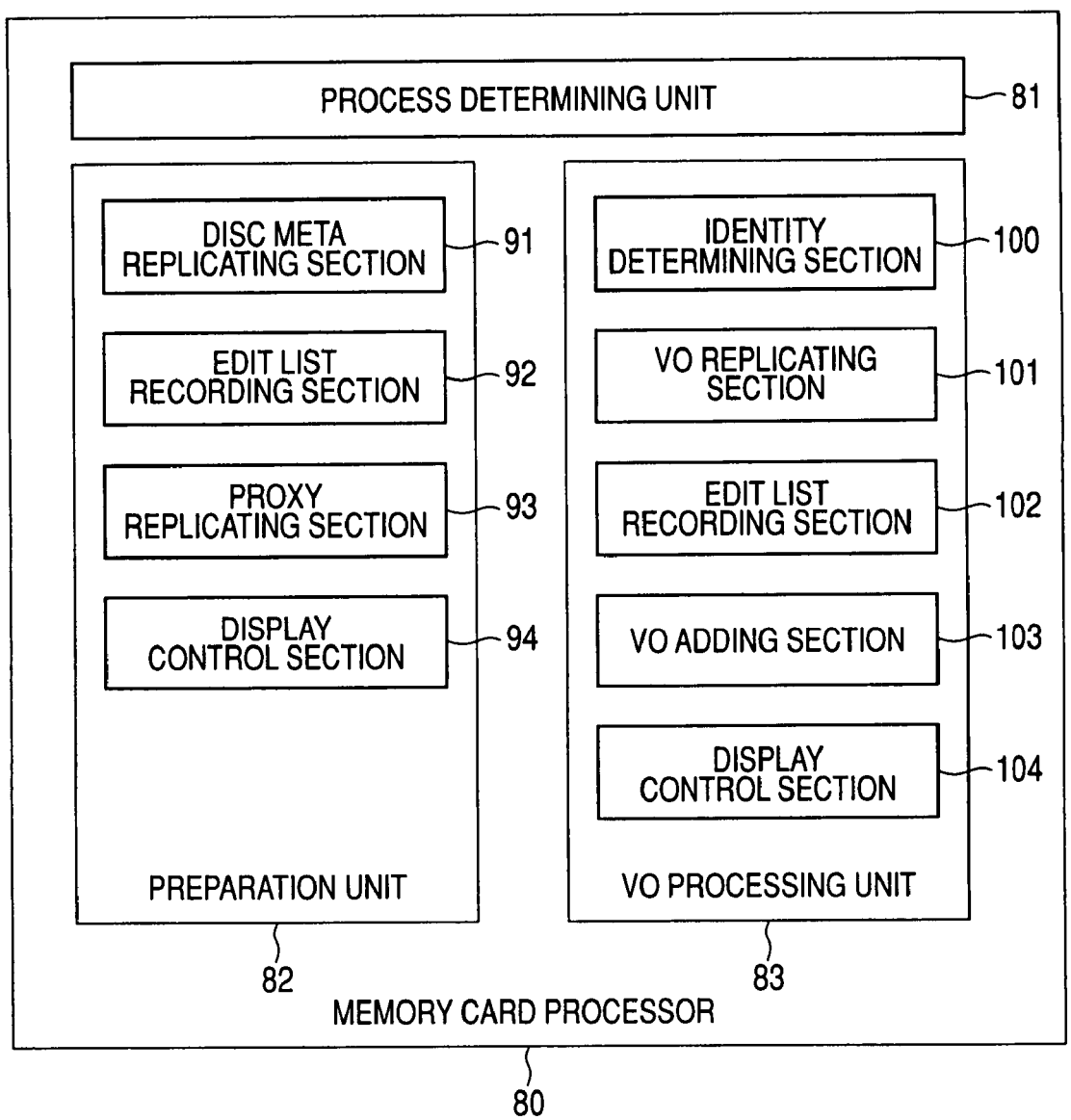
FIG. 3 is a block diagram showing an example of a functional configuration of the VO adding device.

FIG. 3 shows an example of a functional configuration of the memory card processor 80.

The memory card processor 80 shown in FIG. 3 includes a process determining unit 81 which determines whether the process is performed by a preparation unit 82 or a VO processing unit 83 to be described later, a preparation unit 82 which prepares a memory card for VO data recording, and a VO processing unit 83 which performs a VO process which is a process for the VO data.

The process determining unit 81 determines whether the preparation unit 82 or the VO processing unit 83 performs the process on the basis of an operation signal or the like sent from the operation unit I/F 55 and directs starting of the process to the determined preparation unit 82 or the VO processing unit 83 which has been determined for the process.

The preparation unit 82 includes a disc meta replicating section 91, an edit list recording section 92, a proxy replicating section 93, and a display control section 94. The preparation unit starts a process in accordance with the direction sent from the process determining unit 81.

The disc meta replicating section 91 copies disc meta data recorded on the optical disc 21A into the memory card 25. For example, the disc meta replicating section 91 reads disc meta data from the optical disc 21A loaded into the optical disc drive unit 66 by controlling the optical disc drive I/F 54. Thereafter, the disc meta replicating section 91 records the read disc meta data in the memory card 25 by controlling the memory card I/F 60. The disc meta data is data describing a disc ID identifying the optical disc 21A, a bus of a representative image of the optical disc 21A, the title or comment of the optical disc 21A, and the like.

The edit list recording section 92 controls the optical disc drive I/F 54 in accordance with an operation signal corresponding to an user's operation for designating a material edit list which is supplied from the operation unit I/F 55, reads the material edit list designated by the user from the optical disc 21A, and temporarily stores the read material edit list in the temporary storage memory 65 by controlling the temporary storage memory I/F 53. Thereafter, the edit list recording section 92 reads the material edit list from the temporary storage memory 65 by controlling the temporary storage memory I/F 53 and supplies the read material edit list to the proxy replicating section 93 together with creating a proxy edit list on the basis of the read material edit list. Thereafter, the edit list recording section 92 records the proxy edit list in the memory card 25 by controlling the memory card I/F 60.

The proxy replicating section 93 controls the optical disc drive I/F 54 on the basis of the material edit list supplied from the edit list recording section 92 so as to read out the proxy data of the material data constituting the editing result corresponding to the material edit list from the optical disc 21A.

The proxy replicating section 93 controls the optical disc drive I/F 54 and reads out the VO data added to the editing result corresponding to the material edit list from the optical disc 21A on the basis of the material edit list. The proxy replicating section 93 controls the memory card I/F 60 and records the read proxy data and the VO data in the memory card 25.

The display control section 94 generates image data for displaying various screens which are related with writing of the memory card for VO data recording and supplies the image data to the video display I/F 59, whereby the screens are displayed in the video monitor 44.

For example, the display control section 94 generates video data for displaying a designated screen which is a screen for designating a material edit list corresponding to the proxy edit list to be recorded in the memory card 25 and supplies the video data to the video display I/F 59, whereby the designated screen is displayed in the video monitor 44. Here, the user operates the operation unit 42 while watching the designated screen displayed in the video monitor 44 for designating a material edit list corresponding to the proxy edit list to be recorded in the memory card 25. An operation signal corresponding to this operation is an operation signal in response to the user's operation for designating the material edit list and is supplied to the edit list recording section 92.

The VO processing unit 83 includes an identity determining section 100, a VO replicating section 101, an edit list recording section 102, a VO adding section 103, and a display control section 104. The VO processing unit 83 starts a process in accordance with a direction from the process determining unit 81.

The identity determining section 100 reads disc meta data from the optical disc 21A by controlling the optical disc drive I/F 54 and reads disc meta data from the memory card 25 by controlling the memory card I/F 60. Thereafter, the identity determining section 100 determines whether the disc meta data read from the optical disc 21A and the disc meta read from the memory card 25 are identical to each other and supplies the result of the determination to the VO replicating section 101 and the edit list recording section 102.

The VO replicating section 101 copies new VO data, which is not recorded on the optical disc 21A, among the VO data corresponding to the proxy edit list from the memory card 25 to the optical disc 21A by controlling the memory card I/F 60 and the optical disc drive I/F 54 on the basis of the result of the determination sent from the identity determining section 100 and the proxy edit list sent from the edit list recording section 102.

The edit list recording section 102 reads a proxy edit list corresponding to the material edit list recorded on the optical disc 21A among the proxy edit lists which are recorded in the memory card 25 by controlling the memory card I/F 60 on the basis of the result of the determination sent from the identify determining section 100. Thereafter, the edit list recording section 102 temporarily stores the read proxy edit list in the temporary storage memory 65 by controlling the temporary storage memory I/F 53.

The edit list recording section 102 reads the proxy edit list from the temporary storage memory 65 by controlling the temporary storage memory I/F 53 and supplies the read proxy edit list to the VO replicating section 101. In addition, the edit list recording section 102 creates a material edit list in which the editing result of the material data is material data changed from proxy data constituting the editing result of proxy data corresponding to the proxy edit list on the basis of the read proxy edit list. In addition, the edit list recording section 102 records the material edit list on the optical disc 21A by controlling the optical disc drive I/F 54.

The VO adding section 103 records VO data in the memory card 25, so that the VO data is reproduced simultaneously with the editing result of proxy data corresponding to the proxy edit list recorded in the memory card 25, whereby the VO is added to the editing result of the proxy data.

Specifically, the VO adding section 103 reproduces proxy data corresponding to a predetermined proxy edit list recorded in the memory card 25 while buffering the proxy data in the temporary storage memory 65 by controlling the temporary storage memory I/F 53, the voice output I/F 57, the video display I/F 59, and the memory card I/F 60 on the basis of an operation signal supplied from the operation unit I/F 55 corresponding to a user's direction for starting the VO addition.

In addition, the VO adding section 103 temporarily stores VO data corresponding to a voice which is input to the microphone 30A during the reproduction of the proxy data in the temporary storage memory 65 by controlling the voice input I/F 51 and the temporary storage memory I/F 53. In addition, the VO adding section 103 records the VO data which is temporarily stored in the temporary storage memory 65 in the memory card 25 by controlling the temporary storage memory I/F 53 and the optical disc drive I/F 54.

In addition, the VO adding section 103 updates the proxy edit list recorded in the memory card 25 on the basis of information on a UMID assigned to the VO data or the like by controlling the memory card I/F 60, so that the VO data is reproduced simultaneously with proxy data which was reproduced at a time of input of the VO data.

The UMID is a unique identifier for each clip for uniquely identifying a clip or VO data globally and is an identifier determined by SMPTE (Society of Motion Picture and Television Engineers).

The display control section 104 generates video data for displaying various screens related with the VO processing and supplies the video data to the video display I/F 59, whereby the screens are displayed in the video monitor 44.

Figure 4:
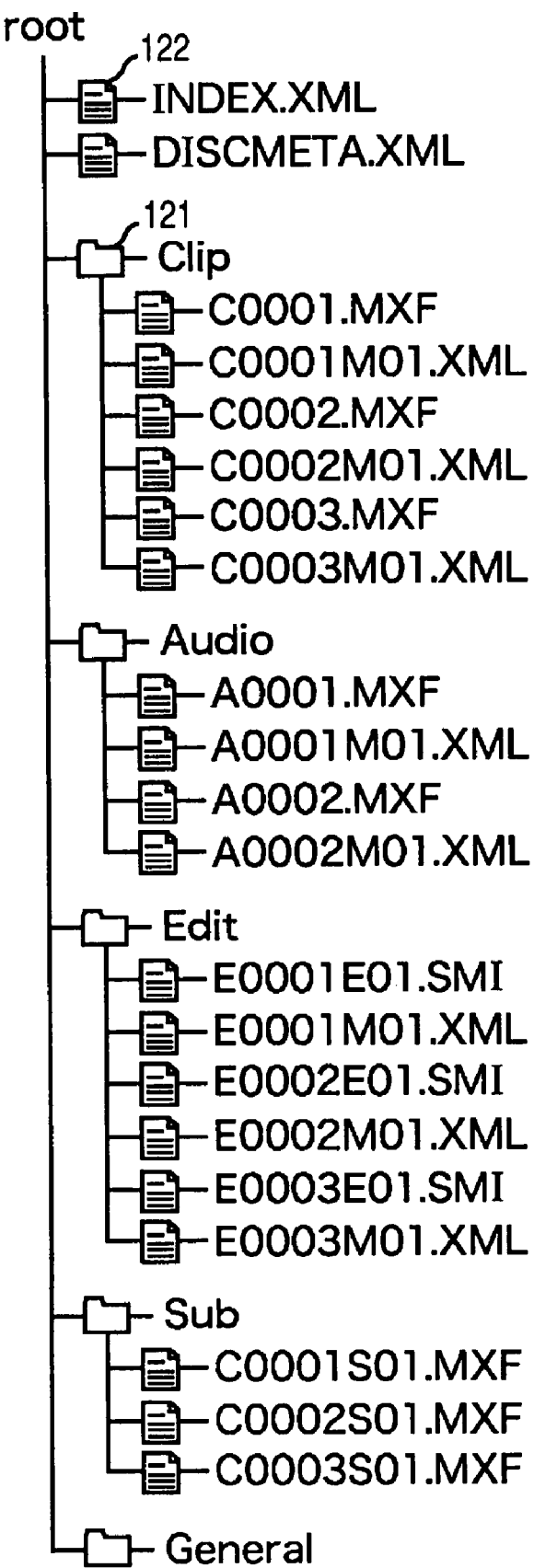
FIG. 4 is a diagram showing an example of a directory structure of files, recorded on an optical disc, to which VO is added according to an embodiment of the invention.

FIG. 4 shows an example of a directory structure of a file recorded on the optical disc 21A to which the VO has been added.

In FIG. 4, a symbol 121 denotes one directory. Each one of the other symbols, although a reference code is not attached thereto, which is similar to the symbol (directory) 121 denotes one directory. A symbol 122 denotes one file. Each one of the other symbols, although a reference code is not attached thereto, which is similar to the symbol (file) 122 denotes one file.

Hereinafter, a directory and a directory symbol are regarded to be the same in description. Likewise, a file and a file symbol are regarded to be the same in description. In order to clearly distinguish directories or files, hereinafter, a file or a directory is followed by its name inside a parenthesis.

In the example shown in FIG. 4, an index file (INDEX.XML) 122 which is a data file describing an index and describes information for managing a clip (described later in detail) and an edit list and a disc meta file (DISC-META.XML) which is a file of disc meta data are included on the optical disc 21A.

In addition, a clip directory (Clip) 121 having files such as material data of clips in its subordinate position, an audio directory (Audio) having VO data files in its subordinate position, an edit list directory (Edit) having edit list files in its subordinate position, and a proxy directory (Sub) having proxy data files in its subordinate position are included on the optical disc 21A.

The material data of clips and the like which are recorded on the optical disc 21A are recorded as separate files for each clip in the clip directory (Clip) 121.

For example, a clip is the unit for the number of times of the image picking-up processes of the camcorder 20. Alternatively, the clip may indicate the unit of a time interval between the start of image picking-up and the end of image picking-up in an image picking-up process, indicate the unit for the lengths of various data acquired by the image picking-up process, or indicate the unit of the data sizes of the various data acquired by the image picking-up process. Moreover, the clip may indicate a set of the various data.

For example, the clip indicates a set of video data acquired by one image picking-up process (image picking-up process from the start of image pickup to the end of image pickup), voice data corresponding to the video data, meta data, and the like.

To be more specific, for example, FIG. 4 shows an example in which three clips of data are recorded on the optical disc 21A.

For example, a first clip file (C0001.MXF) which is a material data file of a clip firstly recorded on the optical disc 21A and a first non real-time meta data file (C0001M01.XML) including meta data, for which real timeliness is not typically required, corresponding to the material data of the clip are included in the subordinate position of the clip directory 121.

In the example shown in FIG. 4, the non real-time meta data file (C0001M01.XML) is described in an XML format for generality.

In addition, a second clip file (C0002.MXF) and a second non real-time meta data file (C0002M01.XML), and a third clip file (C0003.MXF) and a third non real-time meta data file (C0003M01.XML) are included in the subordinate position of the clip directory 121, like the first clip file (C0001.MXF) and the first non real-time meta data file (C0001M01.XML).

In FIG. 4, VO data recorded on the optical disc 21A is recorded as different files for each VO adding process which is a process of adding the VO in the audio directory (Audio) shown below the clip directory (Clip) 121.

For example, in the example shown in FIG. 4, a first VO data file (A0001.MXF) including the VO data which is recorded by the first time VO adding process and a first meta data file (A0001M01.XML) for VO data which includes meta data corresponding to the VO data are included in the subordinate position of the audio directory (Audio). In addition, a second VO data file (A0002.MXF) and a second meta data file (A0002M01.XML) for VO data are included in the subordinate position of the audio directory, like the first VO data file (A0001.MXF) and the first meta data file (A0001M01.XML) for VO data.

In FIG. 4, edit lists recorded on the optical disc 21A are recorded as different files for each editing process in the edit directory (Edit) which is shown below the audio directory (Audio).

For example, in the example shown in FIG. 4, a first material edit list file (E0001E01.SMI) including a material edit list which is information on the editing result of the first time editing process of the clip recorded on the optical disc 21A and a first meta data file (E0001M01.XML) for material edit list including meta data corresponding to the material data (a part extracted as the material data after editing from material data of the whole clips used for editing) on which editing has been performed or meta data newly generated on the basis of the meta data are included in the subordinate position of the edit directory (Edit).

In the subordinate position of the edit directory, a second material edit list file (E0002E01.SMI) corresponding to the second time editing process of the clip recorded on the optical disc 21A and a second meta data file (E0002M01.XML) for material edit list and a third material edit list file (E0003E01.SMI) corresponding to the third time editing process of the clip recorded on the optical disc 21A and a third meta data file (E0003M01.XML) for material edit list are included, like first material edit list file (E0001E01.SMI) and the first meta data file (E0001M01.XML) for material edit list.

In FIG. 4, proxy data of the clips recorded on the optical disc 21A is recorded as different files for each clip in the proxy directory (Sub) which is shown below the edit directory (Edit).

For example, in the example shown in FIG. 4, a first proxy file (C0001S01.MXF) which is a proxy data file of a clip which is firstly recorded on the optical disc 21A, a second proxy file (C0002S01.MXF) which is a proxy data file of a clip which is secondly recorded on the optical disc 21A, and a third proxy file (C0003S01.MXF) which is a proxy data file of a clip which is thirdly recorded on the optical disc 21A are included in the subordinate position of the proxy directory (Sub).

In addition, a general directory (General), in which files other than clips are included, is included on the optical disc 21A.

FIG. 5 shows an example of a material edit list of a material edit list file, to which the VO has been added, recorded on the optical disc 21A.

FIG. 5 is a diagram showing an example of a detailed description of a material edit list file written in XML. The numbers in start positions of each line shown in FIG. 5 are added only for the convenience of description, and are not parts of the XML description.

The material edit list file includes a material edit list which is information on the editing result of non-destructive editing of a clip and additionally describes the reproducing method of the editing result.

As shown in FIG. 5, the XML description of the material edit list file is mainly constituted by a body part which is surrounded by body tags (<body> and </body>). In the example shown in FIG. 5, the body part is described from the 4th line to the 19th line. From the 1st line to the 3rd line, information indicating that this file is Edit List (edit list) of Professional Disc is described.

Information related with a time-based behavior of editing description is described. In the example shown in FIG. 5, a par element which is described between a start tag "<par>" at the 5th line and the end tag "</par>" at the 18th line is a time container and defines a simple time group which reproduces a plurality of elements simultaneously.

In the example shown in FIG. 5, a first clip (in the example shown in FIG. 5, described as Clip1, and, for example, is a clip of the first clip file (C0001.MXF) shown in FIG. 4), a second clip (in the example shown in FIG. 5, described as Clip2, and, for example, is a clip of the second clip file (C0002.MXF) shown in FIG. 4), and VO data (in the example shown in FIG. 5, described as VoiceOver, and, for example, is VO data of the first VO data file (A0001.MXF) shown in FIG. 4) are described to be reproduced simultaneously.

However, in the example shown in FIG. 5 as described later, the start times of reproduction of two clips are not identical to each other, and actually, the two clips are configured to be continuously reproduced one after the other.

In FIG. 5, a referenced file, a reproduction range of the referenced file, and the like are described in a ref element from the 7th line to 9th line. The description of src="urn:smpte:umid:060A2B3401010105010
10D431300000070D302000935059708004602
0118F454" at 7th line indicates that the UMID assigned to the referenced file is "060A2B3401010105010
10D431300000070D302000935059708004602
0118F454".

The description of clipBegin="smpte-30=00:00:00:00" at the 8th line indicates the start position of the first clip for reproduction, that is, the start position of an editing range in an FTC (File Time Code) of the first clip, in units of frames. The FTC is relative position information sequentially assigned to each frame from a leading frame with the frame number of the leading frame set to zero. The next description of clipEnd="smpte-30=00:00:06:00" at the 8th line indicates the end position of the first clip for reproduction, that is, the end position of the editing range in the FTC of the first clip.

The next description of begin="smpte-30=00:00:00:00" at the 8th line indicates time for start of the first clip, that is, the position of material edit list in the FTC at which the material data starts, in units of frames. The description of smpte-30 indicates that a used time code is an SMPTE time code of 30 frames per second defined by SMPTE.

The description of trackSrc="CH1;CH2;CH3" at the 9th line indicates that the channel numbers of channels (hereinafter, referred to as a reproduction channel) corresponding to voice data to be reproduced among voice data for each channel included in the first clip are in the range of one to three. Hereinafter, the number of voice data channels for reproduction is supposed to be four, and voice data for the four channels is supposed to be included in a clip. Accordingly, in the example shown in FIG. 5, only voice data of three channels having channel numbers 1 to 3 among the four channels of the first is reproduced.

The next description of trackdst="CH1;CH2;CH3" at the 9th line indicates that the channel numbers of channels (hereinafter, referred to as output channels) outputting voice data for the reproduction channels having channel numbers 1 to 3 are one to three. The voice data for the reproduction channels having channel numbers 1 to 3 is output as voice data for channels having the same channel numbers in the example shown in FIG. 5.

As described above, in the example shown in FIG. 5, it is described in the material edit list that the reproduction of the first clip starts from the position of the frame number of "00:00:00:00" at time "00:00:00:00" and ends at the position of the frame number of "00:00:06:00". At this time, the voice data for a channel having a channel number 4 among the four channels included in the first clip is not reproduced. In other words, in the example, since the number of voice data channels for reproduction is four, a channel having the channel number 4 is assigned for the reproduction of the VO data.

In addition, it is described from the 11th line to 13th line for a second clip, like the case for the first clip. In the example shown in FIG. 5, it is described in the material data edit list that the reproduction of the second clip starts from the position of the frame number of "00:00:00:00" at time "00:00:06:00" and ends at the position of the frame number of "00:00:04:00". At this time, as in the case for the first clip, the voice data for channels having channel numbers 1 to 3 among the four channels included in the second clip is output as voice data for the channels having the same channel numbers.

In FIG. 5, a referenced file, a reproduction range of the referenced file, and the like are described in the audio element described from the 15th line to the 17th line. The description of src="urn:smpte:umid:060A2B340101010501010843130 00000D9510E0033360597080046020118F805" at the 15th line indicates that the UMID assigned to the referenced file is "060A2B34010101050101084313000000D9510E0033360 597080046020118F805".

The description of clipBegin="smpte-30=00:00:00:00" at 16th line indicates the start position of the reproduction of the VO data in the FTC of the VO data in units of frames. The next description at the 16th line of clipEnd="smpte-30=00:00:10: 00" indicates the end position of the reproduction of the VO data in the FTC of the VO data. The next description of Begin="smpte-30=00:00:00:00" at the 16th line indicates the start time of the VO data, that is, the position of the material edit list in the FTC at which the VO data starts, in units of frames.

The description at the 17th line of trackSrc="CH4" indicates a channel corresponding to VO data to be reproduced among VO data for the channels included in the first VO data file. It is assumed that VO data of four channels is included in each VO data file. In the example shown in FIG. 5, only the VO data for a channel having a channel number 4 among the four channels of the VO data included in the first VO data file is reproduced.

The next description of trackDst="CH4" at the 17th line indicates that the VO data for a channel having a channel number 4 to be reproduced is output as voice data of a channel having the same channel number 4 as the VO data.

As described above, in the example shown in FIG. 5, it is described in the material edit list that reproduction of the VO data starts from a position of frame number 00:00:00:00 at time 00:00:00:00 and ends at a position of frame number 00:00:10:00. At this time, the VO data for a channel having a channel number 4 among the VO data for the channels included in the first VO data file is reproduced as voice data for a channel having the same channel number as the channel number of the channel for the VO data.

In the material edit list shown in FIG. 5, the above-described reproduction of the first clip, the second clip, and the VO data are described to be performed simultaneously by a par element. Accordingly, the first clip is reproduced from a position of frame number "00:00:00:00" at time "00:00:00: 00" to a position of frame number 00:00:06:00 for 6 seconds, with the VO data being simultaneously reproduced from a position of frame number "00:00:00:00" to a position of frame number "00:00:06:00".

At this time, voice data for a channel of channel numbers 1 to 3 included in the first clip file is output as voice data for channels of channel numbers 1 to 3, and VO data for a channel of channel number 4 included in the first VO data file is output as voice data for a channel of channel number 4.

The second clip is reproduced from a position of frame number "00:00:00:00" at time "00:00:06:00" to a position of frame number "00:00:04:00" for 4 seconds, with the VO data being simultaneously reproduced from a position of frame number "00:00:06:00" to a position of frame number "00:00: 10:00".

Similarly for a case of the first clip, voice data for a channel of channel numbers 1 to 3 included in the second clip file is output as voice data of channels of channel numbers 1 to 3, and VO data for a channel of channel number 4 included in the first VO data file is output as voice data for a channel of channel number 4.

As described above, the material edit list shown in FIG. 5 is edited such that the first and second clips are continuously reproduced and the VO data is reproduced over two clips of the first and second clips.

Although the example of UMIDs for data shown in FIG. 5 is described as above, the UMIDs indicate only the description positions of the UMIDs or the like in the material edit list, and the UMIDs are virtual UMIDs of which values do not have any meaning. The UMIDs shown in FIG. 5 are combinations of meaningless symbols which are different from actually used UMIDs, and appropriate UMIDs which are generated on the basis of a method determined by SMPTE are actually described in the positions of the above-described virtual UMIDs instead of the above-described virtual UMIDs.

The proxy edit list recorded in the memory card 25 is configured as the material edit list shown in FIG. 5. In order to distinguish the proxy edit list from the material edit list, for example, instance numbers of UMIDs of clips described in the proxy edit list are set to be different from those in the material edit list.

Thus, the edit list recording sections 92 and 102 generate one between the material edit list and the proxy edit list by changing instance numbers of UMIDs of clips described in the other.

Figure 6:
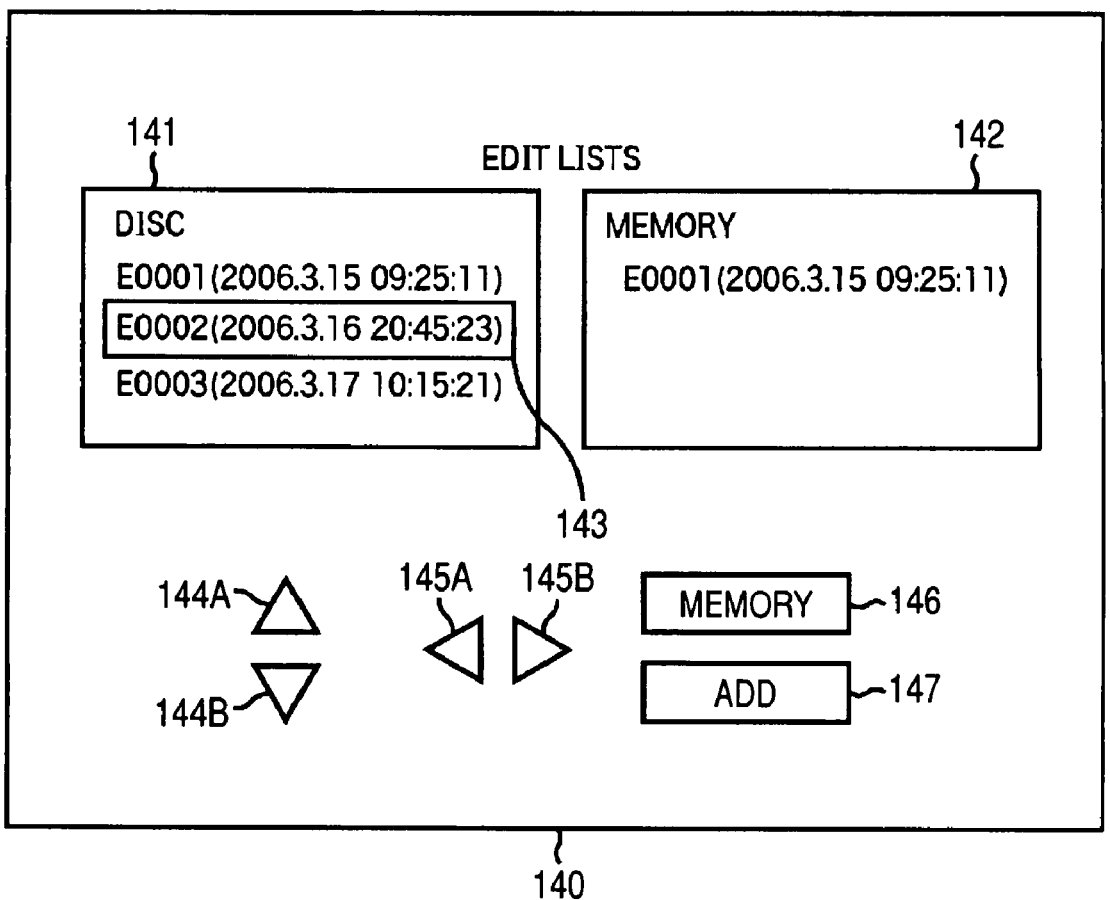
FIG. 6 is a diagram showing an example of a designated screen according to an embodiment of the invention.
Figure 7:
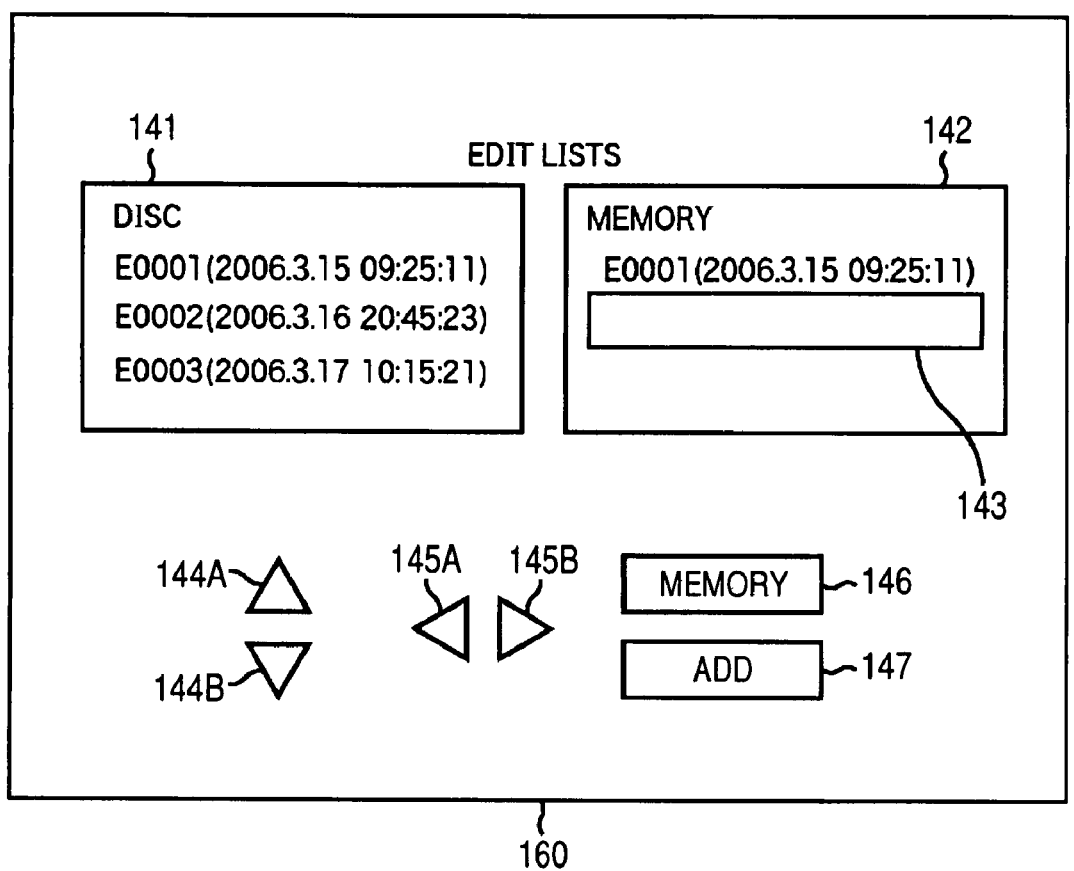
FIG. 7 is a diagram showing another example of a designated screen according to an embodiment of the invention.
Figure 8:
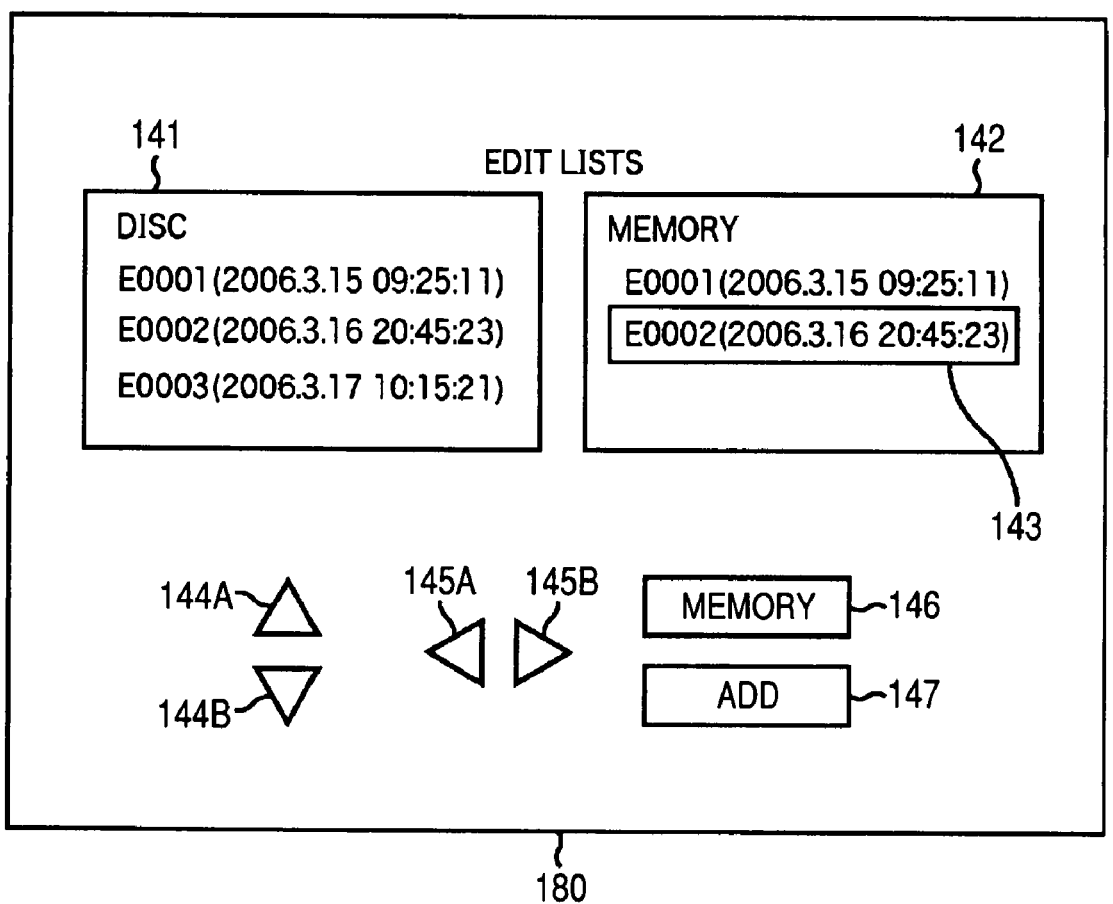
FIG. 8 is a diagram showing another example of a designated screen according to an embodiment of the invention.

FIGS. 6 to 8 show examples of designated screens displayed in the video monitor 44 shown in FIG. 2.

At first, when a display of a designated screen is directed by a user, a designated screen 140 shown in FIG. 6 is displayed in the video monitor 44. The designated screen 140 shown in FIG. 6 includes an optical disc display section 141, a memory card display section 142, a cursor 143, an up direction button 144A, a down direction button 144B, a left direction button 145A, a right direction button 145B, a memory button 146, and an "add" button 147.

In the optical disc display section 141, the name and generation date/time of the material edit list recorded in the optical disc 21A are displayed. The name and generation date/time of the material edit list, for example, are included in a header of the material edit list file. In the example shown in FIG. 6, the directory structure of a file recorded in the optical disc 21A is the same as the directory structure shown in FIG. 4. In addition, the leading five characters of names of the first to third material edit list files are respectively followed by the generation dates/times of the first to third material edit list files enclosed in parentheses to be displayed in the optical disc display section 141.

In the memory card display section 142, the name and generation date/time of a material edit list file of a material edit list which is the base of the proxy edit list recorded in the memory card 25 are displayed.

The name and generation date/time of a material edit list file of a material edit list which is the base of the proxy edit list, for example, are included in a header of the proxy edit list file. As described above, since a material edit list which is the base of a proxy edit list is corresponded to the proxy edit list, the VO adding device 30 can update the material edit list which is the base of the proxy edit list on the basis of the proxy edit list recorded in the memory card 25.

In the example shown in FIG. 6, the proxy edit list which has been generated on the basis of the first material edit list file recorded in the optical disc 21A is recorded in the memory card 25. In addition, the generation date/time of the first material edit list file enclosed in a parenthesis is displayed in the memory card display section 142 following the leading five characters of the name of the first material edit list file.

The cursor 143 is displayed in a position corresponding to the name and generation date/time of the material edit list file which is displayed in the optical disc display section 141 or the memory card display section 142. The cursor 143 is operated when the user selects a wanted material edit list file or proxy edit list file, and the cursor is moved to a position corresponding to the display position of the name and generation date/time of the material edit list file or the proxy edit list file wanted by the user.

The up direction button 144A and the down direction button 144B are respectively operated for moving the cursor 143 in an upward direction and in a downward direction. The left direction button 145A and the right direction button 145B are respectively operated for moving the cursor 143 in a left direction and in a right direction.

The memory button 146 is operated for temporarily storing the material edit list or the proxy edit list which corresponds to the position of the cursor 143 in the temporary storage memory 65. The "add" button 147 is operated for recording the proxy edit list or the material edit list generated on the base of the material edit list or the proxy edit list which is temporarily stored in the temporary storage memory 65 in the memory card 25 or the optical disc 21A corresponding to the position of the cursor 143.

In the designated screen shown in FIG. 6, when the user operates the memory button 146, the edit list recording section 92 temporarily stores the material edit list of the second material edit list file (E0002E01.SMI) corresponding to the position of the cursor 143 shown in FIG. 6 in the temporary storage memory 65.

Then, when the user operates the right direction button 145B, the designated screen 140 shown in FIG. 6 is changed to a designated screen 160 shown in FIG. 7. The cursor 143 is moved to the memory card display section 142 as shown in FIG. 7. Here, the user operates the up direction button 144A or the down direction button 144B such that the cursor 143 is moved to be positioned to a blank region of the memory card display section 142 in which nothing is displayed. In the example shown in FIG. 7, since the cursor 143 is already positioned in the blank region, the user does not move the cursor 143.

In FIG. 7, when the user operates the "add" button 147, the designated screen 160 shown in FIG. 7 is changed to a designated screen 180 shown in FIG. 8. The edit list recording section 92 generates a proxy edit list on the basis of the material edit list of the second material edit list file which is temporarily stored in the temporary storage memory 65 and records the generated proxy edit list in the memory card 25 as a proxy edit list file.

As a result, as shown in FIG. 8, in addition to the name and generation date/time of the first material edit list file "E0001 (2006.3.15.09:25:11)", the name and generation date/time "E0002(2006.3.16.20:45:23)" of the second material edit list file which is the base of the proxy edit list newly recorded in the memory card 25 is displayed in the memory card display section 142.

Next, a memory card process which is performed on the memory card 25 by the memory card processor 80 shown in FIG. 3 will be explained with reference to FIGS. 9 and 10. The memory card process, for example, is started when the VO adding device 30 shown in FIG. 2 is turned on.

In a step S1, the process determining unit 81 determines whether the memory card 25 is installed to the VO adding device 30. When it is determined that the memory card 25 is not installed, the process determining unit waits until the memory card 25 is installed.

Alternatively, when it is determined that the memory card 25 is installed to the VO adding device 30 in the step S1, the process is moved to a step S2, and the process determining unit 81 determines whether disc meta data is recorded in the memory card 25, that is, whether the memory card 25 is a memory card for recording VO data.

In the step S2, when it is determined that the disc meta data is not recorded in the memory card 25, the process is moved to a step S3, and the process determining unit 81 displays a message confirming whether the memory card 25 is used as a memory card for recording the VO data in the video monitor 44. The user directs whether the memory card 25 is used as a memory card for recording VO data by operating the operation unit 42.

After the step S3 is processed, the process is moved to a step S4, and the process determining unit 81 determines whether the memory card 25 is used as a memory card for recording VO data, that is, whether the memory card is directed to be used as a memory card for recording VO data by the user, in accordance with an operation signal from the operation unit I/F 55.

In the step S4, when it is determined that the memory card 25 is not used as a memory card for recording VO data, the process ends. Alternatively, when it is determined that the memory card 25 is used as a memory card for recording VO data in the step S4, the process determining unit 81 determines that the process thereafter is to be performed by the preparation unit 82 and directs the preparation unit 82 to start the process. Thereafter in a step S5, the display control section 94 of the preparation unit 82 displays a message indicating, or instructing an operation to load the optical disc 21A in the video monitor 44, and the process is moved to a step S6.

In the step S6, the disc meta replicating section 91 determines whether the optical disc 21A is loaded into the optical disc drive 66 shown in FIG. 2. When it is determined that the optical disc is loaded, the process is moved to a step S7.

In the step S7, the disc meta replicating section 91 reads out disc meta data of the disc meta data file (DISCMETA.XML) (FIG. 4) which is recorded in the optical disc 21A and copies the disc meta data into the memory card 25.

Alternatively, when it is determined that the disc meta data is recorded in the memory card 25 in the step S2, that is, that the memory card 25 is used as a memory card for recording VO data, the process is moved to a step S8, and the process determining unit 81 displays a message for confirming whether VO is to be added in the video monitor 44. The user directs whether to add the VO by operating the operation unit 42.

In the step S9, the process determining unit 81 determines whether VO is to be added, that is, whether the addition of the VO is directed by the user, in accordance with an operation signal from the operation unit I/F 55.

Figure 10:
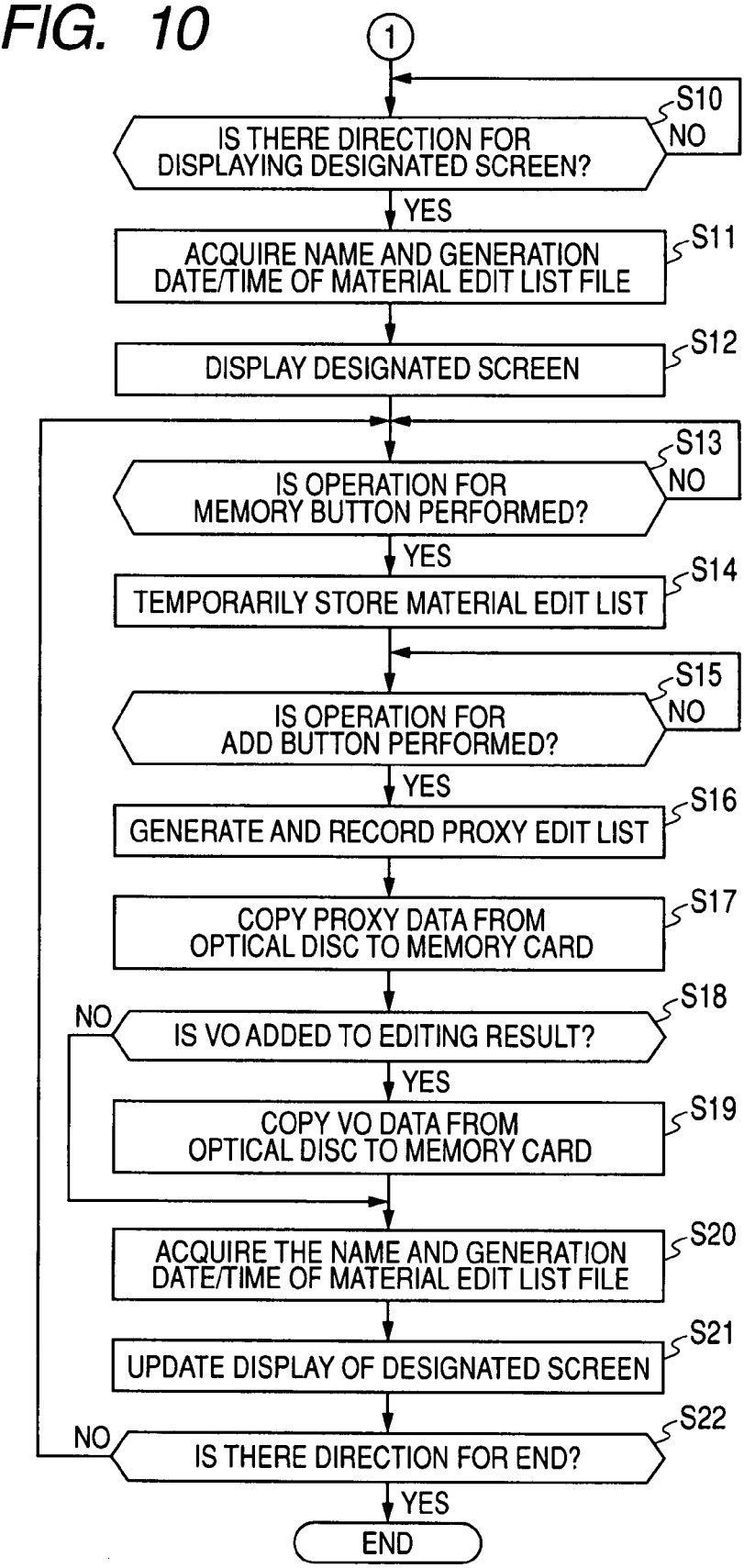
FIG. 10 is a flowchart describing the memory card process.

After the step S7 is processed or when it is determined that the VO is not to be added in the step S9, the process is moved to a step S1 shown in FIG. 10, and the display control section 94 determines whether display of the designated screen 140 (FIG. 6) is directed by the user in accordance with the operation signal from the operation unit I/F 55.

When the display control section 94 determines that the display of the designated screen 140 is not directed by the user in the step S10, the display control section 94 waits until the display of the designated screen 140 is directed.

Alternatively, when it is determined that the display of the designated screen 140 is directed by the user in the step S10, the process is moved to a step S11, and the display control section 94 acquires the name and generation data/time of the material edit list file which is recorded on the optical disc 21A by controlling the optical disc drive I/F 54 simultaneously with acquiring the name and generation date/time of the material edit list file which is the base of the proxy edit list file recorded in the memory card 25 by controlling the memory card I/F 60.

Specifically, the display control section 94 acquires the name and generation date/time of the material edit list file described in a header of the material edit list file which is recorded in the optical disc 21A by reading out the header of the material edit list file. In addition, the display control section 94 reads out a header of the proxy edit list file recorded in the memory card 25 to acquire the name and generation date/time of the material edit list file, that is the base of the proxy edit list file, which are recorded in the header.

After the step S11 is processed, the process is moved to a step S12, and the display control section 94 displays the designated screen 140 on the basis of the name and date/time of the material edit list file acquired in the step S11. Specifically, the display control section 94, as shown in FIG. 6, displays the name and generation date/time of the material edit list file, which is recorded in the optical disc 21A, acquired in the step S 11 in the optical disc display section 141. In addition, the display control section 94, as shown in FIG. 6, displays the name and date/time of the material edit list file which is the base of the proxy edit list file, which is acquired in the step 11, recorded in the memory card 25 in the memory card display section 142.

In addition, the display control section 94 displays a cursor 143, an up direction button 144A, a down direction button 144B, a left direction button 145A, a right direction button 145B, a memory button 146, and an "add" button 147.

The user moves the cursor 143 to a position corresponding to the name and generation date/time of a wanted material edit list displayed in the optical disc display section 141 by operating the operation unit 42 and operates the memory button 146.

After the step S12 is processed, the process is moved to a step S13, and the edit list recording section 92 determines whether the memory button 146 (FIG. 6) is operated in accordance with an operation signal from the operation unit I/F 55 as an operation for designating a material edit list. When it is determined that the memory button 146 is not operated, the edit list recording section 92 waits until the memory button 146 is operated.

Alternatively, when it is determined in the step S13 that the memory button 146 is operated, the process is moved to a step S14, and the edit list recording section 92 reads out a material edit list corresponding to the cursor 143 from the optical disc 21A and stores the material edit list in the temporary storage memory 65.

After operating the memory button 146, the user moves the cursor 143 to a blank region in the memory card display section 142 by operating the right direction button 145B and then operating the up direction button 144A or the down direction button 144B. Accordingly, the designated screen 140 displayed in the video monitor 44, for example, is changed to a designated screen 160 shown in FIG. 7. Then, the user operates the "add" button 147 (FIG. 6).

After the step S14 is processed, the process is moved to a step S15, and the edit list recording section 92 determines whether the operation of the "add" button 147 is performed as an operation for designating a material edit list in accordance with an operation signal from the operation unit I/F 55. When it is determined that the "add" button 147 is not operated, the edit list recording section 92 waits until the "add" button 147 is operated.

Alternatively, when it is determined in the step S15 that the "add" button 147 is operated, the process is moved to a step S16, and the edit list recording section 92 reads out the material edit list temporarily stored in the step S14, generates a proxy edit list on the basis of the material edit list, and records the proxy edit list in the memory card 25 corresponding to the position of the cursor 143. In addition, the edit list recording section 92 supplies the read material edit list to the proxy replicating section 93.

After the step S16 is processed, the process is moved to a step S17, and the proxy replicating section 93 reads out the proxy data of material data constituting the editing result corresponding to the material edit list from the optical disc 21A on the basis of the material edit list sent from the edit list recording section 92 and copies the proxy data into the memory card 25.

After the step S17 is processed, the process is moved to a step S18, and the proxy replicating section 93 determines whether VO is added in the editing result corresponding to the material edit list on the basis of the material edit list, that is, whether an audio element is included in a par element of the material edit list shown in FIG. 5.

In the step S18, when it is determined that the VO is added in the editing result, the process is moved to a step S19, and the proxy replicating section 93 reads out VO data added to the editing result corresponding to the material edit list on the basis of the material edit list from the optical disc 21A and copies the VO data into the memory card 25. Thereafter, the control is moved to a step S20.

Alternatively, when it is determined that VO data is not added in the editing result in the step S18, the process of the step S19 is skipped, and the process is moved to a step S20.

In the step S20, the display control section 94 acquires the name and generation data/time of the material edit list file which is recorded in the optical disc 21A simultaneously with acquiring the name and generation date/time of the material edit list file which is the base of the proxy edit list file recorded in the memory card 25, similar to the process of step S11.

After the step S20 is processed, the process is moved to step S21, and the display control section 94, similar to the process of step S12, displays the designated screen on the basis of the name and date/time of the material edit list file acquired in the step S20. Accordingly, for example, the designated screen 160 displayed in the video monitor 44 is changed to a designated screen 180 shown in FIG. 8.

After the step S21 is processed, the process is moved to step S22, and the edit list recording section 92 determines whether the end of display of the designated screen is directed, that is, whether an end button which is not shown in the figure is pressed by the user, in accordance with an operation signal from the operation unit I/F 55.

When it is determined that the end of display of the designated screen is not directed in step S22, the control is moved back to step S13, and the above-described process is repeated.

Alternatively, When it is determined that the end of display of the designated screen is directed in step S22, the process ends.

Figure 9:
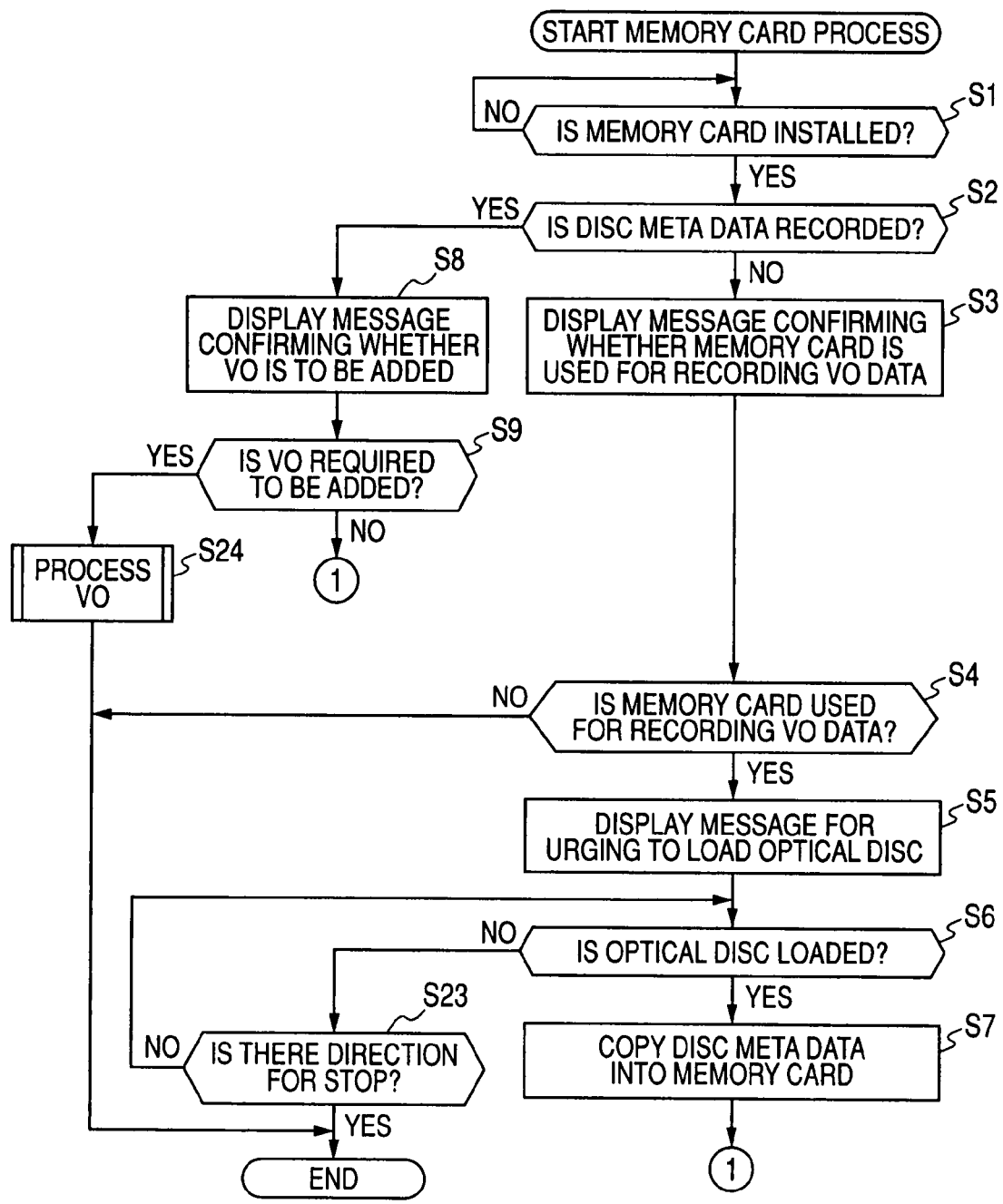
FIG. 9 is a flowchart describing a memory card process according to an embodiment of the invention.

When it is determined that the optical disc 21A is not loaded in the step S6 shown in FIG. 9, the process is moved to step S23, and the display control section 94 determines whether the use of the memory card 25 as a memory card for recording the VO data is directed to be stopped, or terminated, by the user in accordance with an operation signal from the operation unit I/F 55.

When it is determined that the use of the memory card 25 as a memory card for recording the VO data is not directed to be stopped by the user in step S23, the process is moved back to step S6, and the process of steps S6 and S23 is repeated until the optical disc 21A is loaded or stopping the use of the memory card as a memory card for recording VO data is directed.

Alternatively, when it is determined that the use of the memory card 25 as a memory card for recording the VO data is directed to be stopped by the user in step S23, the process ends.

When it is determined that VO is added in step S9, the process determining section 81 determines that process thereafter is performed by the VO processing unit 83 and accordingly, directs the VO processing unit 83 to start the process, and the process is moved to step S24.

The VO processing unit 83 performs a VO process which is a process of the VO data in step S24. The VO process will be described below in detail with reference to FIG. 11.

Next, the VO process of step S24 shown in FIG. 9 will be described with reference to FIG. 11.

In step S41, the identity determining section 100 of the VO processing unit 83 reads out disc meta data from the memory card 25 and supplies the disc meta data to the display control section 104. Thereafter, the process is moved to step S42.

In step S42, the display control section 104 displays the title and disc ID of the optical disc 21A, which are included in the disc meta data, corresponding to the memory card 25 and a message urging to load the optical disc 21A in the video monitor 44.

After step S42 is processed, the process is moved to step S43, and the identity determining section 100 determines whether the optical disc 21A is loaded into the optical disc drive unit 66. When it is determined that the optical disc 21A is not loaded, the process is moved to step S44.

In step S44, the identity determining section 100 determines whether a memory mode in which VO is added to the editing result of the proxy data corresponding to the proxy edit list recorded in the memory card 25 is selected as an operation mode of the VO adding device 30 by the user in accordance with an operation signal from the operation unit I/F 55.

When it is determined that the memory mode is not selected by the user as the operation mode in the step S44, the process is moved back to the step S43, and the process of the steps S43 and S44 is repeated until the optical disc 21A is loaded or the memory mode is selected.

Alternatively, when it is determined that the memory mode is selected by the user as the operation mode in the step S44, the process is moved to a step S45, and the VO adding section 103 sets the operation mode of the VO adding device 30 to the memory mode and ends the memory card process.

When the operation mode is the memory mode, the VO adding section 103 reproduces proxy data constituting the editing result corresponding to the proxy edit list on the basis of the proxy edit list recorded in the memory card 25 while buffering the proxy data in the temporary storage memory 65. In addition, the VO adding section 103 records the VO data corresponding to the voice input to the microphone 30A during the reproduction into the memory card 25, so that the VO data is reproduced simultaneously with proxy data which was reproduced at a time when the VO data was input.

As a result, the proxy edit list recorded in the memory card 25 is updated. For example, when the VO adding section 103 adds new VO to the editing result of the proxy data corresponding to the proxy edit list generated on the basis of the material edit list to which VO has been added by overwriting the new VO, the VO adding section updates the UMID described in an audio element of the proxy edit list to a UMID assigned to VO data of the new VO.

As described above, the VO adding device 30 can add VO to the editing result of the proxy data corresponding to the proxy edit list recorded in the memory card 25 by using the memory card 25 which is a memory card for recording VO data.

In the step S43, when it is determined that the optical disc 21A is loaded, the process is moved to a step S46, and the VO processing unit 83 performs a replication process of copying the VO data recorded in the memory card 25 into the optical disc 21A. The replication process will be described below with reference to FIG. 12.

After the step S46 is processed, the process proceeds to a step S47, and the identity determining section 100 sets the operation mode of the VO adding device 30 to a disc mode in which VO is added to the editing result of the material data corresponding to the material edit list recorded on the optical disc 21A and ends the memory card process.

Thereafter, the VO adding device 30 reproduces material data constituting the editing result corresponding to the material edit list on the basis of the material edit list recorded on the optical disc 21A while buffering the material data in the temporary storage memory 65. In addition, the VO adding device 30 records the VO data corresponding to the voice input to the microphone 30A during the reproduction on the optical disc 21A, so that the VO data is reproduced simultaneously with material data which was reproduced at a time when the VO data was input, whereby the VO is added to the editing result of the material data. As a result, for example, the material edit list shown in FIG. 5 is recorded on the optical disc 21A. The reproducing target may be proxy data other than material data.

Next, the VO replicating process of the step S46 shown in FIG. 11 will be described with reference to FIG. 12.

In step S61, the identity determining section 100 reads out disc meta data from the loaded optical disc 21A and determines whether a disc ID included in the disc meta data and a disc ID included in disc meta data read in the step S41 are identical.

In step S61, when it is determined that the disc IDs are identical, the control is moved to a step S62, and the identity determining section 100 determines whether there is a proxy edit list corresponding to a material edit list recorded on the optical disc 21A among proxy edit lists recorded in the memory card 25.

Specifically, the identity determining section 100 determines whether there is a name, among the names of material edit list files, which is the base of the proxy edit list, included in the header of the proxy edit list file recorded in the memory card 25 identical to a name of the material edit list file included in the header of the material edit list file recorded on the optical disc 21A.

In step S62, when it is determined that there is a proxy edit list corresponding to the material edit list recorded on the optical disc 21A, the process is moved to step S63, and the edit list recording section 102 reads out the proxy edit list and supplies the proxy edit list to the VO replicating section 101 together with generating a material edit list on the basis of the proxy edit list and recording the material edit list on the optical disc 21A.

Accordingly, the material edit list recorded on the optical disc 21A is updated on the basis of the proxy edit list file which is generated on the basis of the material edit list.

Alternatively, the edit list recording section 102 may records the material edit list generated on the basis of the proxy edit list on the optical disc 21A as a new material edit list instead of updating the material edit list recorded on the optical disc 21A.

After step S63 is processed, the process is moved to step S64, and the VO replicating section 101 determines whether a new VO is added to the editing result of the proxy data, that is whether an audio element is included in a par element of the proxy edit list and the VO data of the UMID described in the audio element is recorded on the optical disc 21A, on the basis of the proxy edit list from the edit list recording section 102.

Figure 11:
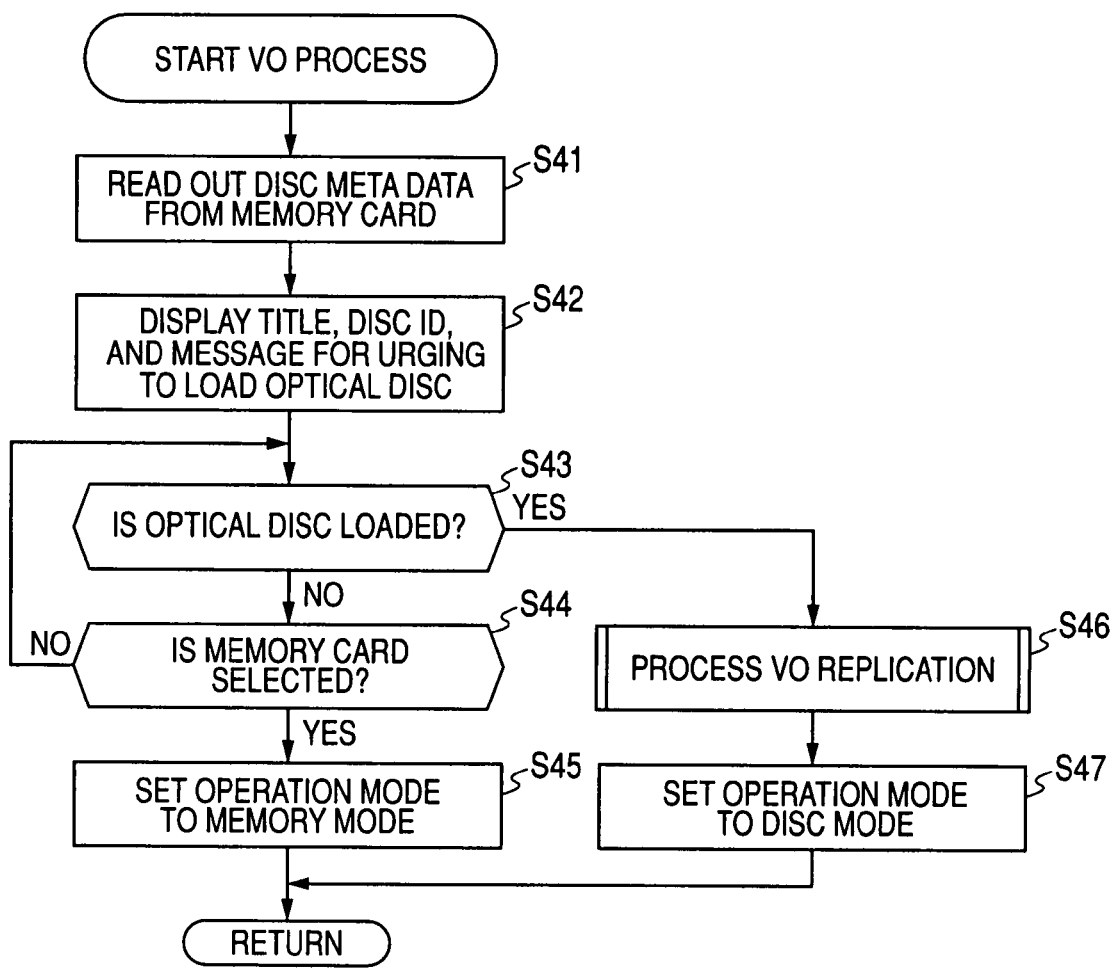
FIG. 11 is a flowchart describing a VO process according to an embodiment of the invention.

In step S64, when it is determined that a new VO is not added to the editing result of the proxy data, the process is moved back to the step S46 shown in FIG. 11, and the above-described process of step S47 is performed.

Alternatively, when it is determined in step S64 that a new VO is added to the editing result of the proxy data, the process is moved to a step S65, and the VO replicating section 101 reads out VO data of the VO from the memory card 25 and copies the VO data to the optical disc 21A. Thereafter, the process is moved back to step S46 shown in FIG. 11, and the above-described process of step S47 is performed.

Alternatively, when it is determined in the step S61 that the disc IDs are not identical, the control is moved to step S66, and the display control section 104 displays a message indicating that the loaded optical disc 21A does not correspond to the memory card 25 in the video monitor 44, and the process is moved back to step S46 shown in FIG. 11, and the above-described process of step S47 is performed.

As described above, the VO adding device 30 reads out the disc meta data from the memory card 25 at a time when the memory card 25 is installed and determines whether a disc ID included in the read disc meta data and a disc ID of the optical disc 21A are identical. When it is determined that the disc IDs are identical, the VO adding device 30 updates a material edit list recorded on the optical disc 21A on the basis of a proxy edit list recorded in the memory card 25, and accordingly, editing information of the editing result of the material data can be updated on the basis of the editing information of the proxy data which is generated by reducing the data size of the material data.

In addition, the VO adding device 30 can record a new VO data on the optical disc 21A by using the installed memory card 25. Accordingly, for example, the VO adding device 24 can add VO that has been added to the editing result of the proxy data in the VO adding device 26 located at a different position by a user different from the user using the VO adding device 24 to the editing result of material data corresponding to the editing result of the proxy data.

In addition, when a material edit list generated on the basis of a proxy edit list recorded in the memory card is recorded on an optical disc as new material edit list, one optical disc on which different VOs are added to the editing result of the same material data can be generated by installing a plurality of memory cards to which different VOs are added to the editing result of the same proxy data and one optical disc on which the editing result of material data corresponding to the editing result of the proxy data and other data are recorded to the VO adding device 30. As a result, for example, a plurality of optical discs in which VOs having different languages, descriptions, or the like or VOs input by different users are added to the editing results can be generated.

In the description above, although the VO adding device 30 adds the VO data to the material data, but only the video data may be recorded in recording and then, the VO data may be added to the video data.

In the description above, the update of the material edit list and record of the VO data are performed through the memory card 25, but the update and record may be performed through a network which is not shown in the figure. In this case, for example, the VO adding device 26 transmits the proxy edit list and the VO data to the VO adding device 24 in accordance with FTP (file transfer protocol), and the VO adding device 24 performs the update of the material edit list and the recording of the VO data using the proxy edit list and VO data transmitted from the VO adding device 26.

Although the material data may be recorded on an optical disc, for example, the material data may also be recorded on a magnetic disk, a magneto-optical disc, a memory card, an attachable/detachable hard disk drive, or similar storage media.

The invention may be applied to a device that adds video data to recorded voice data. Video data supplied from a different device or a different recording medium during the reproduction of voice data recorded on an optical disc or in a memory card is added to the voice data. Moreover, the voice data recorded in the memory card may be data obtained by reducing the data size of the voice data recorded on the optical disc.

In an embodiment of the invention, the steps describing a program stored in a program recording medium may be processed parallel or independently other than processed in a time series as well as processed in a time series.

In any embodiment of the invention, a system means the whole devices constituted by a plurality of devices.

Moreover, the embodiment of the invention is not limited to the above-described embodiments, and various changes may be made therein without departing from the scope of the gist of the invention.

It should be understood by those skilled in the art that various modifications, combinations, sub-combinations and alternations may occur depending on design requirements and other factors insofar as they are within the scope of the appended claims or the equivalents thereof.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

What is claimed is:

1. A recording apparatus that performs a recording operation on a first recording medium on which first identification information for identifying the recording medium, first data, and data editing information which is information on an editing result of the first data are recorded, the recording apparatus comprising:
    a reading unit, implemented by a processor, configured to read second identification information from a detachable second recording medium on which the second identification information for identifying a predetermined recording medium, first low resolution data which is obtained by reducing the data size of second data recorded on the predetermined recording medium, and first low resolution data editing information which is information on an editing result of the first low resolution data are recorded;
    a determination unit, implemented by the processor, configured to determine whether the second identification information read by the reading unit matches the first identification information; and
    an update unit, implemented by the processor, configured to update the data editing information recorded on the first recording medium on the basis of the first low resolution data editing information recorded on the second recording medium when the determination unit determines that the second identification information matches the first identification information.

2. The recording apparatus according to claim 1, wherein additional data to be added to the editing result of the first low resolution data is recorded on the second recording medium, wherein the first low resolution data editing information is the editing result of the first low resolution data to which the additional data is added, and wherein the update unit additionally records the additional data on the first recording medium when the determination unit determines that the second identification information matches the first identification information.

3. The recording apparatus according to claim 2, wherein the first and second data are material data including video data, the first low resolution data is proxy data of which data size is smaller than that of the material data, and the additional data is voice-over data.

4. The recording apparatus according to claim 1, wherein a third recording medium which can be attached or detached is installed, and the recording apparatus further comprises a recording control unit for recording on the third recording medium the first identification information, second low resolution data which is obtained by reducing the data size of the first data, and second low resolution data editing information which is information on the editing result of the second low resolution data generated on the basis of the data editing information.

5. A recording control method for controlling a recording operation on a first recording medium on which first identification information for identifying the recording medium, first data, and data editing information which is information on the editing result of the first data are recorded, the method comprising the steps of:
    reading second identification information from a detachable second recording medium on which the second identification information for identifying a predetermined recording medium, first low resolution data which is obtained by reducing the data size of second data recorded on the predetermined recording medium, and first low resolution data editing information which is information on an editing result of the first low resolution data are recorded;
    determining whether the read second identification information matches the first identification information; and
    updating the data editing information recorded on the first recording medium on the basis of the first low resolution data editing information recorded on the second recording medium when the second identification information is determined to match the first identification information.

6. A non-transitory computer-readable medium for storing a program for allowing a computer to execute a process of controlling a recording operation on a first recording medium on which first identification information for identifying the recording medium, first data, and data editing information which is information on the editing result of the first data are recorded, the program comprising the steps of:
    reading second identification information from a detachable second recording medium on which the second identification information for identifying a predetermined recording medium, first low resolution data which is obtained by reducing the data size of second data recorded on the predetermined recording medium, and first low resolution data editing information which is information on an editing result of the first low resolution data are recorded;
    determining whether the read second identification information matches the first identification information; and
    updating the data editing information recorded on the first recording medium on the basis of the first low resolution data editing information recorded on the second recording medium when the second identification information is determined to match the first identification information.

* * * * *